United States Patent [19]

Pastor et al.

[11] Patent Number: 4,891,750
[45] Date of Patent: Jan. 2, 1990

[54] OPTICAL CHARACTER RECOGNITION BY FORMING AND DETECTING MATRICES OF GEO FEATURES

[75] Inventors: Jose Pastor, Westport; Evelina I. Zemelman, Wilton, both of Conn.

[73] Assignee: Pitney Bowes Inc., Stamford, Conn.

[21] Appl. No.: 924,473

[22] Filed: Oct. 29, 1986

[51] Int. Cl.[4] .............................................. G06K 9/62
[52] U.S. Cl. ..................................... 382/21; 382/25; 382/34
[58] Field of Search ..................... 382/25, 21, 23, 26, 382/34

[56] References Cited

U.S. PATENT DOCUMENTS

| | | | |
|---|---|---|---|
| 3,541,511 | 11/1970 | Genchi et al. | 382/25 |
| 3,605,093 | 9/1971 | Parks et al. | 382/21 |
| 3,638,188 | 1/1972 | Pincoffs et al. | 382/26 |
| 3,890,596 | 6/1975 | Beun et al. | 382/26 |
| 4,193,056 | 3/1980 | Morita et al. | 382/25 |
| 4,628,532 | 12/1986 | Stone et al. | 382/25 |

OTHER PUBLICATIONS

King-Sun Fu, "Synthetic Pattern Recognition" Chapter 4, *Handbook of Pattern Recognition and Image Processing*, Academic Press Inc., 1986, pp. 85-102.
Beun, "A Flexible Method for Automatic Reading of Handwritten Numerals", *Philips Technical Review*, vol. 33, 1973, No. 4, pp. 89-101.
Sakai et al., Extraction of Invarient Picture Sub-Structures by Computer, *Computer Graphics and Image Processing*, (1972), pp. 81-96.
Tour et al., "Recognition of Handwritten Characters by Topological Feature Extraction and Multilevel Categorization" IEEE Transactions on Computers, Jul. 1972, pp. 776-782.

*Primary Examiner*—Leo H. Boudreau
*Attorney, Agent, or Firm*—Peter Vrahotes; Melvin J. Scolnick; David E. Pitchenik

[57] ABSTRACT

An alphanumeric character is recognized by optically scanning that character, detecting the occurrence of predetermined geographical features in the scanned image, comparing the detected geographical features to a store of particlar geographical features which identify respective alphanumeric characters, and identifying the scanned image as the alphanumeric character having those geographical features to which the detected geographical features favorably compare. The aforementioned geographical features comprise lagoons (formed as enclosed areas) and bays (formed as open areas). A matrix representing the juxtapositions of the detected geographical features is generated and compared with stored predetermined matrices which, in turn, represent predetermined characters.

34 Claims, 18 Drawing Sheets

FROM IMAGE PICK-UP 10

FROM IMAGE THINNING CONTROL 12

FIG. 2

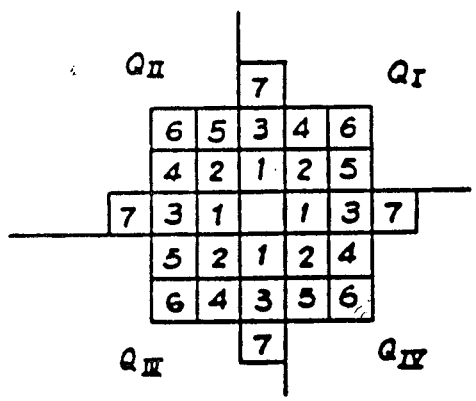
FIG.6A   FIG.6B
FIG.9A
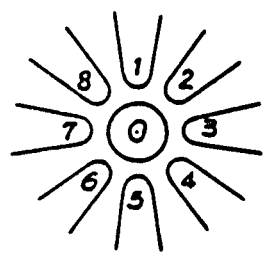
FIG.7
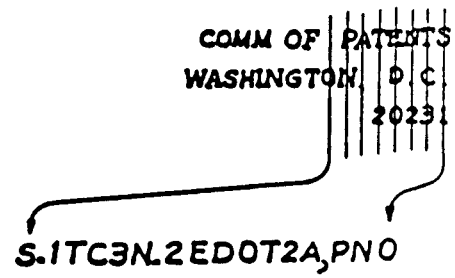
FIG.9B
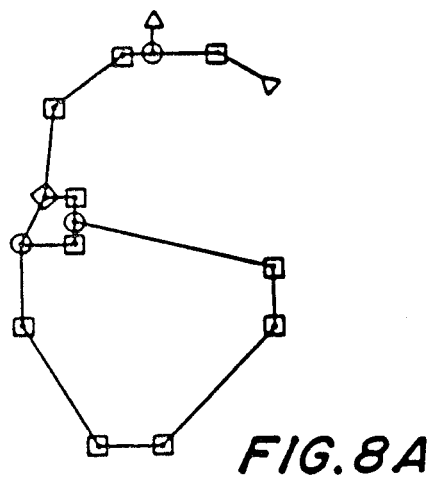
FIG.8A
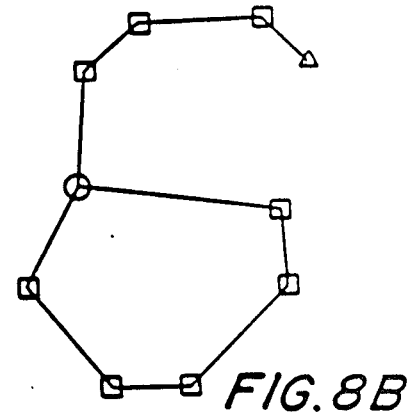
FIG.8B

FIG. 11A
BASIC CHARACTER: L/BS
BNE + L/BS + BNW 
FIG. 11B
FIG. 11C
BNE+L/BS+BNW/BW

FIG. 14A

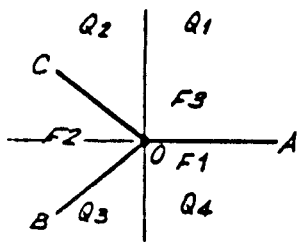

$$\frac{F3 + F2}{F1} \quad OR \quad \frac{F3}{F1} + F2$$

$$\begin{vmatrix} F3 & F2 \\ F1 & F1 \end{vmatrix} \quad OR \quad \begin{vmatrix} F3 & F2 \\ F1 & F2 \end{vmatrix}$$

QUADRANT PATTERN = 132

FIG. 14B

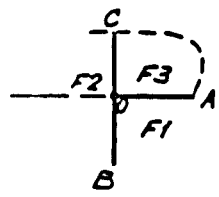

$$\frac{F3}{F1} + F2$$

$$\begin{vmatrix} F3 & F2 \\ F1 & F2 \end{vmatrix}$$

QUADRANT PATTERN = 132

FIG. 14C

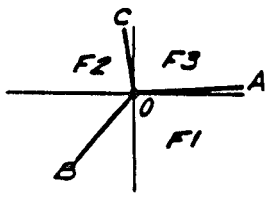

$$\frac{F3}{F1} + F2$$

$$\begin{vmatrix} F3 & F2 \\ F1 & F2 \end{vmatrix}$$

QUADRANT PATTERN = 132

FIG. 14D

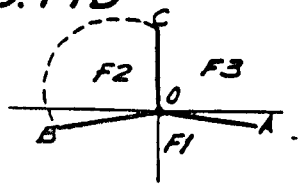

$$\frac{F3 + F2}{F1}$$

$$\begin{vmatrix} F3 & F2 \\ F1 & F1 \end{vmatrix}$$

QUADRANT PATTERN = 143

FIG.14E

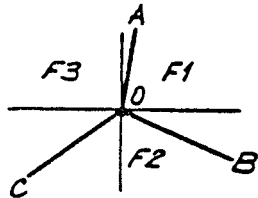

$$\frac{F1}{F2} + F3 \quad OR \quad \frac{F1 + F3}{F2}$$

$$\begin{vmatrix} F1 & F3 \\ F2 & F3 \end{vmatrix} \quad OR \quad \begin{vmatrix} F1 & F3 \\ F2 & F2 \end{vmatrix}$$

QUADRANT PATTERN = 143

FIG.14F

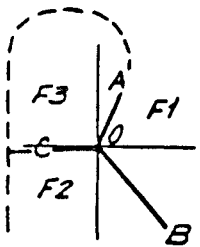

$$F1 + \frac{F3}{F2}$$

$$\begin{vmatrix} F1 & F3 \\ F1 & F2 \end{vmatrix}$$

QUADRANT PATTERN = 143

FIG.14G

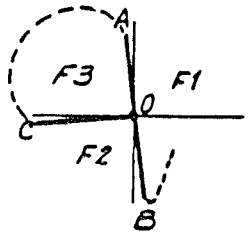

$$F1 + \frac{F3}{F2}$$

$$\begin{vmatrix} F1 & F3 \\ F1 & F2 \end{vmatrix}$$

QUADRANT PATTERN = 432

FIG.14H

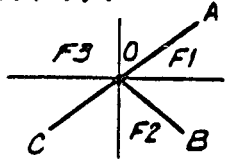

$$\frac{F1}{F2} + F3 \quad OR \quad \frac{F1 + F3}{F2} \quad OR \quad F1 + \frac{F3}{F2}$$

$$\begin{vmatrix} F1 & F3 \\ F2 & F3 \end{vmatrix} OR \begin{vmatrix} F1 & F3 \\ F2 & F2 \end{vmatrix} OR \begin{vmatrix} F1 & F3 \\ F1 & F2 \end{vmatrix}$$

QUADRANT PATTERN = 143

FIG.14I

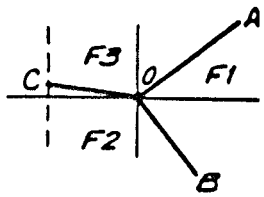

$$F1 + \frac{F3}{F2}$$

$$\begin{vmatrix} F1 & F3 \\ F1 & F2 \end{vmatrix}$$

QUADRANT PATTERN = 142

FIG.14J

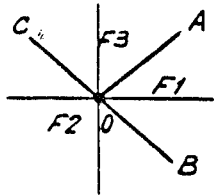

$$\frac{F3}{F1} + F2 \quad OR \quad F1 + \frac{F3}{F2}$$

$$\begin{vmatrix} F3 & F2 \\ F1 & F2 \end{vmatrix} \quad OR \quad \begin{vmatrix} F1 & F3 \\ F1 & F2 \end{vmatrix}$$

QUADRANT PATTERN = 142

FIG.14K

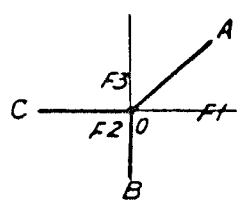

$$F1 + \frac{F3}{F2}$$

$$\begin{vmatrix} F1 & F3 \\ F1 & F2 \end{vmatrix}$$

QUADRANT PATTERN = 132 OR 142 OR 143 OR 133

FIG.14L

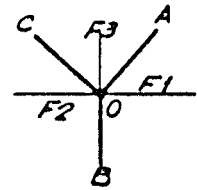

$$\frac{F3}{F1} + F2 \quad OR \quad F1 + \frac{F3}{F2} \quad OR \quad \frac{F3}{F1 + F2}$$

$$\begin{vmatrix} F3 & F2 \\ F1 & F2 \end{vmatrix} \quad OR \quad \begin{vmatrix} F1 & F3 \\ F1 & F2 \end{vmatrix} \quad OR \quad \begin{vmatrix} F3 & F3 \\ F1 & F2 \end{vmatrix}$$

QUADRANT PATTERN = 142 OR 132

FIG.14M

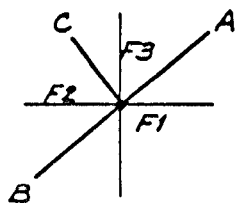

$$\frac{F3}{F1} + F2 \quad OR \quad F1 + \frac{F3}{F2} \quad OR \quad \frac{F3}{F1 + F2}$$

$$\begin{vmatrix} F3 & F2 \\ F1 & F2 \end{vmatrix} \quad OR \quad \begin{vmatrix} F1 & F3 \\ F1 & F2 \end{vmatrix} \quad OR \quad \begin{vmatrix} F3 & F3 \\ F1 & F2 \end{vmatrix}$$

QUADRANT PATTERN = 132

FIG.15A

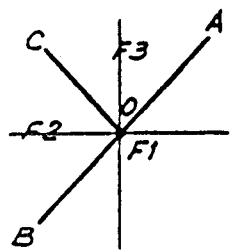

$$\frac{F3}{F1+F2} \quad OR \quad F1 + \frac{F3}{F2} \quad OR \quad \frac{F3}{F1} + F2$$

$$\begin{vmatrix} F3 & F3 \\ F1 & F2 \end{vmatrix} \quad OR \quad \begin{vmatrix} F1 & F3 \\ F1 & F2 \end{vmatrix} \quad \begin{vmatrix} F3 & F2 \\ F1 & F2 \end{vmatrix}$$

QUADRANT PATTERN = 132

FIG.15B

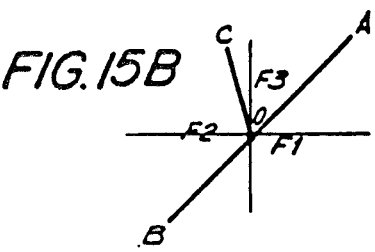

$$\frac{F3}{F1} + F2$$

$$\begin{vmatrix} F3 & F2 \\ F1 & F2 \end{vmatrix}$$

QUADRANT PATTERN = 132

FIG.15C

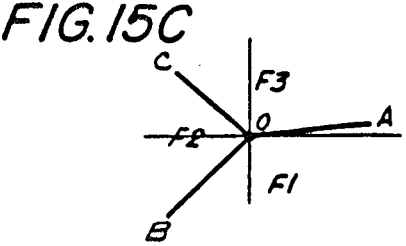

$$\frac{F3}{F1} + F2$$

$$\begin{vmatrix} F3 & F2 \\ F1 & F2 \end{vmatrix}$$

QUADRANT PATTERN = 132

FIG.15D

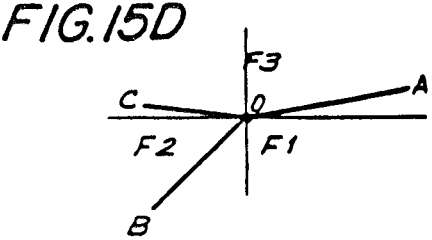

$$\frac{F3}{F1+F2}$$

$$\begin{vmatrix} F3 & F3 \\ F1 & F2 \end{vmatrix}$$

QUADRANT PATTERN = 132

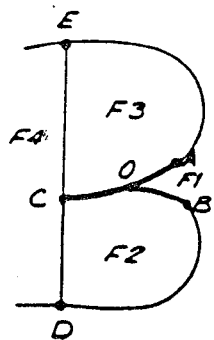
FIG. 16A
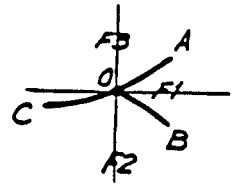
FIG. 16B
$$F1 + \frac{F3}{F2}$$
$$\begin{vmatrix} F1 & F3 \\ F1 & F2 \end{vmatrix} = M1$$
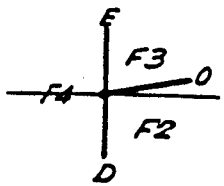
FIG. 16C
$$\frac{F3}{F2} + F4$$
$$\begin{vmatrix} F3 & F4 \\ F2 & F4 \end{vmatrix} = M2$$
FIG. 16D
$M = M1 + M2$
$$M = \begin{vmatrix} F1 & F3 \\ F1 & F2 \end{vmatrix} + \begin{vmatrix} F3 & F4 \\ F2 & F4 \end{vmatrix}$$
$$M = \begin{vmatrix} F1 & F3 & F4 \\ F1 & F2 & F4 \end{vmatrix} = F1 + \frac{F3}{F2} + F4$$
$$\begin{vmatrix} 3 & 0 & 7 \\ 3 & 0' & 7 \end{vmatrix} = BE + \frac{L1}{L2} + BW$$

OPTICAL CHARACTER RECOGNITION BY FORMING AND DETECTING MATRICES OF GEO FEATURES

BACKGROUND OF THE INVENTION

This invention relates to and is an improvement of the technique described in copending application Ser. No. 848,521, filed Apr. 7, 1986, by which an alphanumeric character is recognized by the geographical features (e.g. bays and lagoons) which comprise that character.

Optical character recognition (OCR) devices have long been used to sense and interpret alphanumeric characters that, typically, are provided on a printed page. However, as pointed out in the aforementioned application, such devices usually are limited to the extent that characters are recognizable only if they are printed in one (or, at best, a limited few) predetermined font. Printed characters which, nevertheless, may be clear and formed uniformly as, for example, by a typewriter or other printing machine, will not be recognized if they are formed in some other font.

Another operating limitation of conventional optical character recognition devices that is mentioned in that patent application relates to what is known as "line finding" and "segmentation". A line finding operation is carried out by many conventional OCR devices to locate the lines of characters that are printed on a page. This distinguishes character lines from the spaces between lines and usually is implemented by detecting the distribution of pixel information in the vertical direction. A greater concentration of black pixels represents a line of characters and a low concentration represents a space between lines.

A segmentation operation is intended to locate the spacing between characters in a line of characters. This isolates a block of pixel data, which then is presumed to be limited solely to a character to be identified, whereafter the data block is examined and recognized. Typical segmentation operations are successful if the characters in a line are spaced uniformly and are printed in, for example, Roman-type font. Characters that are printed at angles, such as italics, often cannot be isolated. Rather, the segmentation operation senses portions of adjacent characters, presumes that such portions comprise a single character, and then attempts, unsuccessfully to identify a "character" formed of such portions. Similarly, typical segmentation operations often cannot separate (or "segment") characters that are smudged or blurred because of the lack of a well-defined space between such characters. Thus, a block of data representing a character to be identified cannot be formed. Likewise, a break that might be present in a character may be interpreted erroneously as a space between adjacent characters, resulting in two separate blocks representing partial characters rather than a single block representing a whole (albeit broken) character.

The aforementioned application suggests that these disadvantages of conventional optical character recognition devices are attributed primarily to the fact that, in most such devices, character segmentation (or separation) might not be successful, thus impeding the comparison of a properly scanned character to a reference, or standard geometric form of that character. Significant deviations between the scanned and reference characters, such as differences in font, misalignment of the scanned character, apparent "connections" between independent characters, or "breaks" in a single character, largely due to improper character segmentation, prevent accurate identification. While various comparison techniques have been proposed heretofore, most optical character recognition methods rely upon a "template" comparison of scanned characters in order to identify those characters.

In the OCR technique disclosed in the above-mentioned application, predetermined geographical features in a scanned character are detected, and the detected geographical features are compared to a store of particular geographical features of which known alphanumeric characters are comprised. The scanned character is identified as the alphanumeric character having geographical features which compare favorably to the detected geographical features. The relative positions of the detected geographical features with respect to each other is a primary factor in identifying the scanned character.

The detected geographical features are lagoons, which are formed as enclosed areas, and bays, which are formed as open areas. The types and relative positions of the bays, as well as the relative positions of those bays to detected lagoons, determine the identity of the scanned character.

In the technique of the aforementioned application, the number of "class 1" and "class 3" points included in the scanned area are detected. A "class 1" point is defined as the free end of a link (a link is a portion of a line included in the character), and a "class 3" point is defined as a point formed by the juncture of three links. Also considered are "class 4" points which are defined as points formed by the juncture of four links; and one "class 4" point is equivalent to two "class 3" points. The number of "class 1" and "class 3" points included in the scanned character significantly narrows the set of characters in which the scanned character is included. The geographical features of the scanned character then are compared to the geographical features of the characters in that set. Since geographical features are detected and analyzed, the particular font of which the character is formed is not significant because a given character includes certain minimum geographical features irrespective of its font.

In carrying out this geofeature identification technique, pixels are detected as a character is scanned, and the coordinates of each detected pixel (for example, the XY coordinates) are stored. Only the XY coordinate at the start of a link and the XY coordinate at its end need be stored; and these XY coordinates are determined and stored in real time, as the character is scanned. Depending upon the number of links connected to a particular XY coordinate, the class of the point defined by that XY coordinate is established. The presence of lagoons and bays is ascertained by tracing paths, in predetermined directions, from one connected link to the next, that is, from one stored XY coordinate at the beginning of a link to the next stored XY coordinate which, in most cases, is the end point of one link and the beginning point of a connected link. A lagoon is sensed when the traced path returns to a particular XY coordinate included therein; and a bay is ascertained as a function of changes in the X and Y directions as a path is traced.

OBJECTS OF THE INVENTION

Therefore, it is an object of the present invention to provide an improved technique of optically recognizing alphanumeric characters which avoids the aforementioned disadvantages attendant conventional optical character recognition (OCR) devices.

Another object of this invention is to provide an improvement for use in the OCR technique disclosed in U.S. patent application Ser. No. 848,521.

A further object of this invention is to provide an OCR technique which is capable of recognizing multiple fonts, and even recognizing handprinted characters.

Yet another object of this invention is to provide an improved OCR technique in which particular geographical features which comprise alphanumeric characters are detected; and the character is identified as a function of the type and juxtapositions of those geographical features.

A further object of this invention is to provide an improved OCR technique which detects intersection points in a character to be recognized, generates a matrix representing the juxtaposition of geographical features present at each intersection point, sums the matrices for all of the intersection points of the character, and identifies the character as a function of the summed matrices.

Another object of this invention is to provide an OCR technique in which a character is scanned, intersection points and their close surrounding points (defined below as "triad" points in the character are detected, a graphical analysis of the detected triad points is made, and a matrix representative of the geographical features at an intersection point is selected in accordance with that analysis.

A still further object of this invention is to provide an OCR technique of the aforementioned type wherein the graphical analysis of the triad points includes sensing the quadrants (relative to the intersection point) in which the triad points are disposed, and selecting one or more matrices to represent the geographical features as a function of those quadrants.

Various other objects, advantages and features of the present invention will become readily apparent from the ensuing detailed description, and the novel features will be particularly pointed out in the appended claims.

SUMMARY OF THE INVENTION

In accordance with this invention, an improvement over the OCR technique disclosed in U.S. patent application Ser. No. 848,521 is provided, in which a character is scanned, predetermined geographical features which are present in the scanned character are detected, and a matrix representing the juxtapositions of the detected geographical features is generated. The generated matrix is compared with stored predetermined matrices, each stored matrix representing a particular alphanumeric character or "standard" symbol (such as found on typewriter and computer keyboards). Based upon this comparison, the scanned character is identified as the alphanumeric character or symbol represented by the matrix to which the generated matrix favorably compares.

As an aspect of this invention, each intersection point in the scanned character (an intersection point is formed of at least three intersecting links) is detected and the respective geographical features which are present at each intersection point are determined. A submatrix representing the juxtapositions of the geographical features at a respective intersection point is generated, and the submatrices which are provided for the various intersection points are summed to generate an overall character-representing matrix.

As a feature, the particular orientation of geographical features present at an intersection point may be represented by plural submatrices. The particular submatrix which is selected to properly represent the juxtapositions of those geographical features is determined by their particular orientation. In one embodiment, the orientation of geographical features at an intersection point is determined by the positions of the links which define that intersection point. In particular, each link ends in, or includes, a triad point, and the particular quadrants in which the triad points are disposed are detected (a quadrant is formed simply by superimposing an abscissa and an ordinate at the intersection point). Depending upon the order of these quadrants (in a preferred embodiment, the quadrants in which the various triad points are disposed are arranged in a clockwise order about the intersection point), a set of preestablished submatrices is selected. In the event that the selected set includes more than a single submatrix, the proper submatrix is selected from that set as a function of the angles between the respective links and the abscissa and coordinate.

In accordance with another feature of this invention, each submatrix is comprised of rows and columns of elements, each element identifying a particular geographical feature and, preferably, each element simply is a feature identification code. The rows and columns of elements represent "operators" which are indicative of those features which are next to each other and those features which are above each other, thus representing the juxtaposition of geographical features at an intersection point. As an aspect of this feature of the present invention, an overall matrix representing a scanned character having more than one intersection point is formed by summing the submatrices that have been generated for each intersection point (as aforementioned) by overlapping a row of elements or a column of elements common to the summed submatrices.

As in U.S. patent application Ser. No. 848,521, the geographical features which are detected in the scanned character are comprised of bays and lagoons.

BRIEF DESCRIPTION OF THE DRAWINGS

The following detailed description, given by way of example and not intended to limit the present invention solely to the particular embodiments shown and described herein, will best be understood in conjunction with the accompaning drawings in which:

FIG. 2 is a chart illustrating the various sets of characters which are defined by the "class 1" and "class 3" points included therein;

FIGS. 6A and 6B are matrices which are useful in connecting or extending links in a "soft" broken character;

FIG. 7 is a diagrammatic representation of the decimal notations used to designate each geographical feature;

FIGS. 8A and 8B represent the manner in which distortions in a scanned alphanumeric character are minimized;

FIGS. 9A and 9B are useful in understanding the manner in which the invention of U.S. patent application Ser. No. 848,521 identifies alphanumeric characters which are present in multiple lines;

FIGS. 11A-11D represent the font insensitivity of the OCR system described in the aforementioned application and, as an example, different configurations of a character ("A") having a basic geofeature construction are, nevertheless, identified;

FIGS. 14A-14M illustrate different juxtapositions of geographical features formed at an intersection point and the respective submatrices that represent such juxtaposed features;

FIGS. 15A-15D illustrate the manner in which a representative submatrix changes as the relative positions of the geographical features described by the submatrix changes;

FIG. 16A-16D represent the manner in which a matrix formed by the summation of submatrices is representative of the character "B"

DETAILED DESCRIPTION OF A PREFERRED EMBODIMENT

Figure 1:
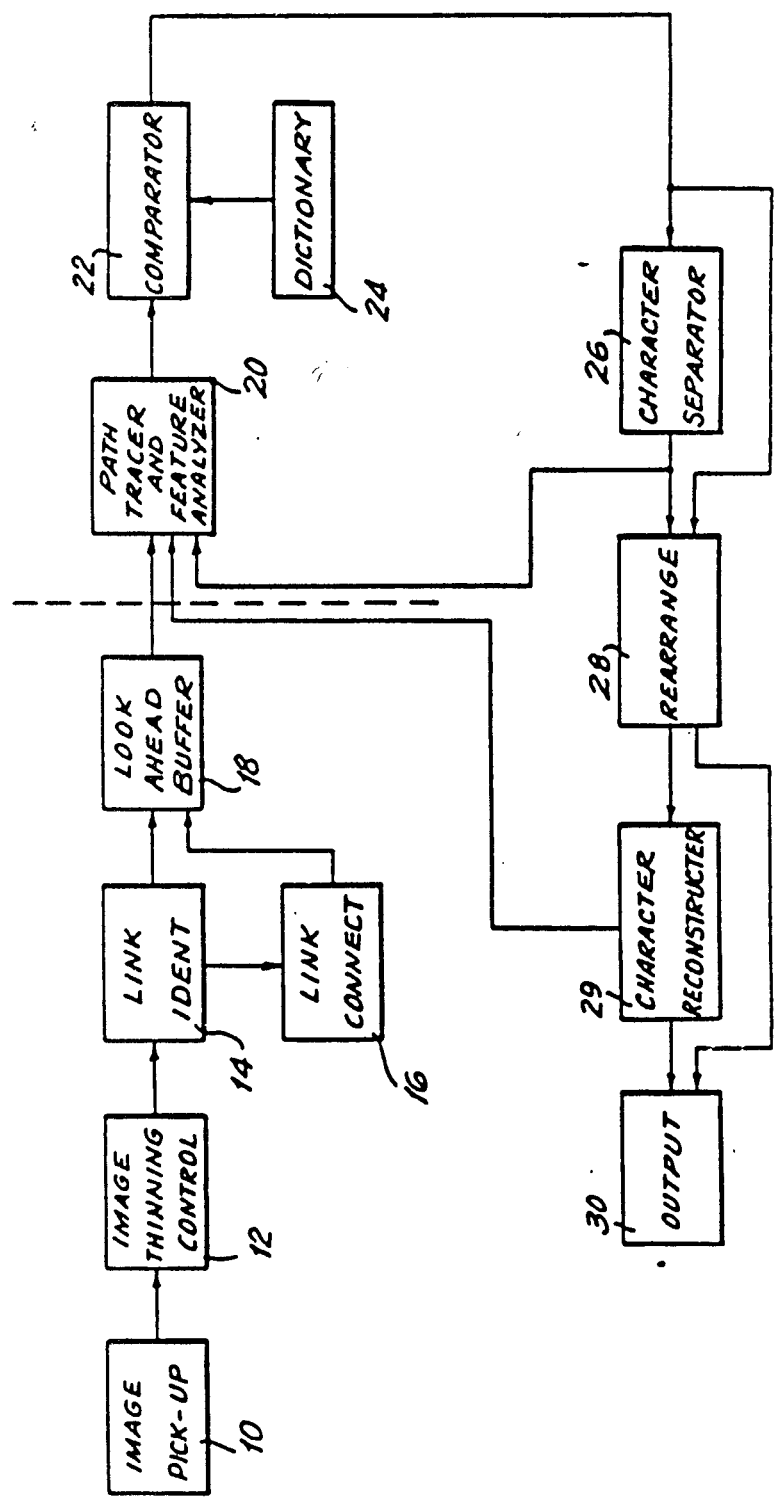
FIG. 1 is a functional block diagram of the OCR system disclosed in U.S. patent application Ser. No. 848,521 which is implemented by the combination of circuitry, or "hardware", together with a suitably programmed micro- or mini-computer (i. e. "software")

Referring first to FIG. 1, there is illustrated a functional block diagram of a preferred embodiment of the present invention. As mentioned above, this block diagram may be implemented by a combination of "hardware" and "software", that is, a suitably programmed microcomputer or minicomputer may be used to carry out this invention. The elements comprising the system illustrated in FIG. 1 include an optical image pick-up device 10, an image thinning control 12, a link identifier 14, a look-ahead buffer 18, a path tracer and geographical feature analyzer 20, a feature comparator 22, a character separator 26, a character re-arranger 28, a character reconstructor 29 and an output 30. Optical image pick-up device 10 may comprise a conventional optical scanner and, preferably, comprises a single column of optical image sensors disposed in a linear array. This array may be as long as desired, but should be within the practical limitations of size, the size of a buffer, the size of a memory and the frequency at which scanning is carried out, as will become apparent from the ensuing description. In one embodiment, the array was long enough to extend across at least three lines of typewritten characters. As a numerical example, the linear array may be a CCD array comprised of 1,024 pixels. Alternatively, optical image pick-up device 10 may be formed as an n×m array of conventional sensors, such as a two-dimensional CCD array. The purpose of device 10 is to sense the presence of visually perceptible information on a page and to generate signals representing the sensed information. Typically device 10 includes not only the CCD pick-up elements, but also quantization and binarization means to distinguish between "black" and "white" contrasts formed between black characters printed on a white page, as sensed by the pick-up sensors. Of course, other character/background contrasts may be used; and it is expected that optical image pick-up device 10 is capable of detecting such contrasts to generate appropriate image-representing signals.

The image signals generated by device 10 are coupled to image thinning control 12 by a conventional preprocessor (not shown) which fills in small "holes" in the binarized image and removes small spurious marks therefrom. Control 12 is described in detail in U.S. Pat. No. 4,539,704, issued Sept. 3, 1985 and U.S. Pat. No. 4,574,357, issued Mar. 4, 1986, both assigned to the assignee of the present invention; and is adapted to convert a relatively thick image produced by device 10 to a relatively thin image. More particularly, image thinning control 12 functions to reduce the thickness of the scanned image to the thickness of a single pixel. That is, the apparent strokes which form the character exhibit a thickness of one pixel. This image thinning operation is best appreciated from FIG. 1A, wherein the character "S" is detected by image pick-up device 10 and produced (in binary form) as the illustrated image; and image thinning control 12 serves to "thin" that image to the form shown in FIG. 1B. For simplification, extraneous elements normally included in the thinned image are not illustrated in FIG. 1B. It is seen that the image thinning operation serves to produce an image formed of links that are merely one pixel wide.

The thinned, binary image produced by image thinning control 12 (FIG. 1B) is supplied to link identifier 14, which operates in the manner described in greater detail below to detect and identify the respective links which constitute a sensed character. Essentially, the pixels which constitute a picked up binary image are analyzed; and the beginning and ending points of each link are identified and stored. Advantageously, these points are stored as XY coordinates for the subsequent purpose of determining the number and type of critical points included in the sensed image, and for the additional purpose of analyzing the geographical features of that image. As will be explained, link identifier 14 functions as the document is scanned. It will be appreciated that, during such scanning, a particular pixel might be identified initially as being included in a particular link. However, on further scanning, it may turn out that such pixel actually is included in a different link. To allow for such subsequent determinations, look-ahead buffer 18 is coupled to link identifier 14 and serves to store therein the initial and, if necessary, the changed identification of the link in which a pixel is included.

A link connector 16 also is coupled to link identifier 14 and, as will be described in conjunction with the matrices shown in FIGS. 6A and 6B, determines if a "blank" pixel should, in fact, be "filled in" and connected to an existing link. Preliminary determinations as to the particular link in which a "filled in" pixel is included are supplied by link connector 16 to look-ahead buffer 18. Of course, and as will be explained, as scanning continues, such preliminary determinations may be altered as additional pixels are detected.

Look-ahead buffer 18 preferably has a capacity to store the XY coordinates of beginning and ending points of links that are included in, for example, seven successive scan columns. It has been found that preliminary determinations regarding the particular link in which a pixel is included will be corrected, if necessary, after seven columns (three preceding columns, the column in which a pixel subject to preliminary determination is present, and then three succeeding columns) are scanned.

The scanning of a "block" of data which, in many instances, is a block representing a character to be identified, is ended when all connected links end in a pixel that is spaced from the next closest pixel (e.g. the beginning pixel of an adjacent character) by at least three "blank" pixels. That is, it is assumed that a complete character has been scanned when the last "filled in" pixel stored in look-ahead buffer 18 is surrounded by an area of blank pixels, this area being at least three pixels high and three pixels wide. At that time, the data block stored in the look-ahead buffer is supplied to further processing means for identification of the potential character represented by that block of data.

Figure 2:
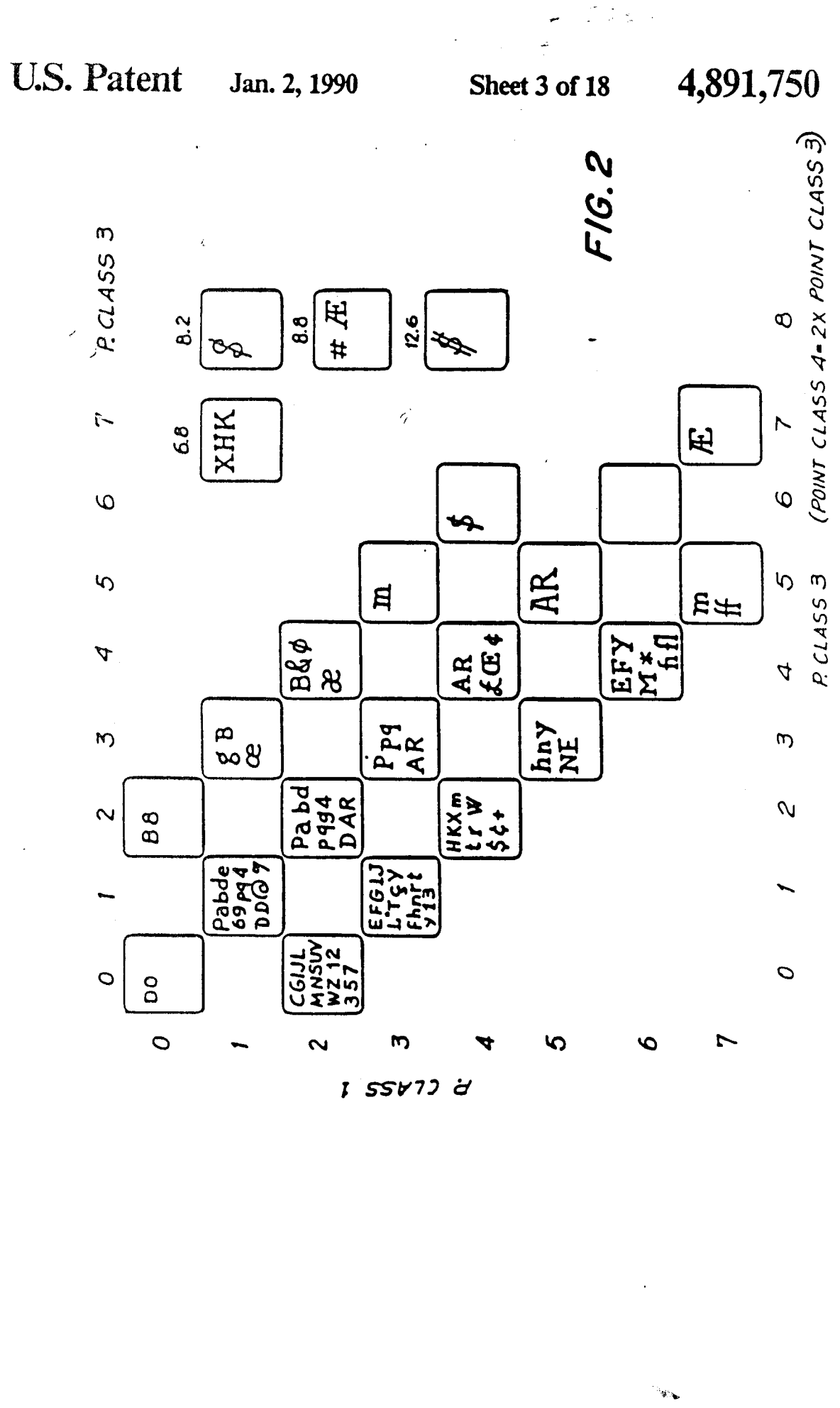

Look-ahead buffer 18 is coupled to path tracer and feature analyzer 20 for the purpose of supplying thereto digital information representing the XY coordinates at the beginning and end points of each link, together with a digital representation of the particular link defined by those points (sometimes referred to as a "tag") and, optionally, digital representations of the two links (if any) joined by that link. Path tracer and feature analyzer 20 is adapted to operate in accordance with a program established therefor to trace a path from link to connected link based upon this supplied information. Advantageously, this path tracing operation commences at a "class 1" point and terminates at another "class 1" point. If the scanned image does not include any "class 1" points (examples of such characters are illustrated in FIG. 2), the path tracing operation commences at a "class 3" point; and if there are no "class 3" points, the scan tracing operation commences at a "class 2" point. Such path tracing is accomplished by following the XY coordinate data representing at least selected pixels included in the scanned image, as will be described in greater detail below. As a path is traced, changes in the XY data are sensed and used to determine the type of geographical feature being traced. In addition to identifying the presence of a bay, the particular orientation of that bay (e.g. a bay which opens to the "north", "northeast", "east", "southeast", "south", "southwest", "west" or "northwest") also is determined. Path tracer and feature analyzer 20 also functions to trace a path commencing at a "class 3" point and to sense when a path returns to the same point from which it commenced, thus identifying the path as forming a lagoon. The position of the identified bays and lagoons relative to each other are ascertained as a function of the XY data defining the pixels, or points, from which the bays and lagoons are formed.

Path tracer and feature analyzer 20 also includes a smoother whose purpose is to eliminate artifacts from the thinned binary image. Such artifacts are referred to herein as "whiskers", which appear as small links that protrude from the image, "puddles" which appear as small lagoons, and "beaches" which appear as small zig-zag links. Whiskers may be detected as a function of their length, and thereafter removed. For example, a protruding link of no more than three pixels may be assumed to be a whisker. A small lagoon whose width and length are less than some threshold amount may be assumed to be a puddle. And connected links which form a concavity (more fully explained below) of small size and of particular orientation with respect to preceding and following concavities (and convexities) may be assumed to be a beach. Whiskers, puddles and beaches are removed, or ignored, before geographical features are analyzed.

The data derived by path tracer and feature analyzer 20, that is, the data representing the types and relative positions of detected geographical features, are supplied to comparator 22. Also supplied to the comparator is an indication of the number of "class 1" and "class 3" points of which the scanned image is comprised. This point classification data identifies a particular set of characters having representative geographical feature data stored in a memory referred to herein as dictionary 24, and the detected geographical features are compared to the geographical features of the characters included in this stored set. As a result of this comparison, comparator 22 identifies the particular character which has been scanned. The comparator thus verifies that the detected geographical features are not arbitrary but, rather, constitute a known character. It converts an unknown image to a recognized character.

Comparator 22 is coupled to character separator 26 which functions to separate joined characters by "breaking" or ignoring one or more sensed links which join two characters that had been identified by comparator 22. It is anticipated that, in some instances, such as when printed characters are smudged or blurred, or dirt or ink extends between two printed characters, the geographical features derived by path tracer and feature analyzer 20 for one character will result in a favorable comparison to the characters stored in dictionary 24, but the geographical features which are detected by reason of the joining of the two characters will result in a failure to identify as a single character the joined characters. Character separator 26 cooperates with comparator 22 to recognize that two independent characters are joined by one or more links, and then functions to ignore (or electronically erase) those links so as to separate, or disjoin the joined characters. As a result, the two independent characters which otherwise are not identified by comparator 22 now are recognized.

Character separator 26 is coupled to rearranger 28 which is adapted to position the characters sensed by comparator 22 in respective horizontal lines. As mentioned above, image pick-up device 10 preferably is formed of a single column of CCD image sensing elements. Advantageously, this single column is of a greater longitudinal dimension than the expected width (or height) of a line of printed characters. In one embodiment, this single column of image sensors extends across three lines of characters printed in typical type font. In the preferred embodiment of this invention, character scanning is achieved in a top-to-bottom and right-to-left configuration. As a result, if three lines of characters are scanned in one "pass" of image pick-up device 10, it is expected that such characters will be identified in the following order: the rightmost (for the purpose of the present discussion, also referred to as the first) character of the top line followed by the first character of the second line, followed by the first character of the third line, followed by the second character of the first line, followed by the second character of the second line, followed by the second character of the third line, and so on. It is appreciated that the XY data which is generated in response to the scanning of each character includes maximum and minimum X coordinates as well as maximum and minimum Y coordinates. From this data, the average Y coordinate of each identified character may be ascertained. Such average Y coordinate thus indicates the particular line in which the identified character resides. Rearranger 28 functions to return the characters identified by comparator 22 to the appropriate lines from which they were scanned.

It is appreciated that rearranger 28 also functions to colineate characters which may be printed or presented to image pick-up device 10 in skewed alignment. The average Y coordinate or, alternatively, the "center of gravity" of each sensed character (the center of gravity may be derived by weighting the average Y coordinate as a function of the Y coordinates of all of the pixels which comprise the character) is determined to ascertain its relative vertical position on the page. This, in turn, determines the correct line in which the character is positioned. Thus, skewed characters may be rearranged in proper line-by-line alignment by rearranger 28.

FIG. 1 shows the output of character separator 26 additionally fed back to path tracer and feature analyzer 20. This is because once two joined characters are detected and the link (or links) between them is broken, the data block representing each separated character should be analyzed to confirm or ascertain its identity.

The output of rearranger 28 is coupled to character reconstructor 29 for detecting "hard" breaks in a character and for joining the data blocks of those hard broken portions of a character to form a complete data block. That is, it is expected that a hard break will be represented by, for example, two unrecognized data blocks of relatively small size (i.e. small height and width dimensions), known as "out of range" data blocks, or one unrecognized out of range data block and one within range data block. Based on the center of gravity of these data blocks, as well as the proximity of the respective links therein, the two data blocks may be close enough to be joined. A joint that connects the hard broken blocks is provided, and the joined blocks then are viewed simply as a within range block. This data block is fed back to path tracer and feature analyzer 20 to allow identification of the image represented by that data block. However, if hard breaks are not detected, for example, if rearranger 28 does not supply any out of range blocks, character reconstructor 29 is effectively by-passed and the rearranger supplies the recognized character to output 30.

As shown in FIG. 1, the rearranger is coupled to output 30 which may be any suitable output device. For example, output 30 may comprise a display screen for displaying the optically read characters, word processing apparatus for "creating" a document from the optically sensed characters, communication apparatus for transmitting electronic representations of the optically sensed characters, or other output means. In a particular utilization of the instant invention wherein the characters which are scanned by image pick-up device 10 comprise an address printed or otherwise written on an envelope, output device 30 may comprise mail sorting equipment which functions to sort such envelopes as a function of the detected zip code and address information printed thereon.

A more detailed explanation of particular functions carried out by the system illustrated in FIG. 1 is set out below.

Figure 1A:
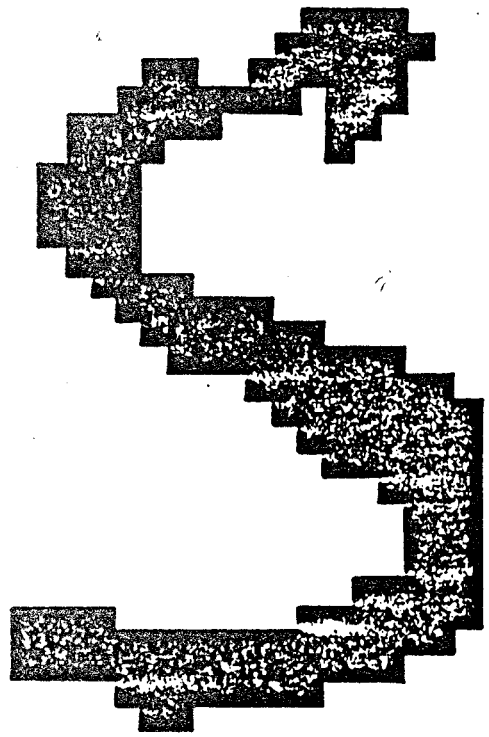
FIGS. 1A, 1B and 1C represent the pixels which are detected as a result of scanning two examples of characters and are helpful in understanding some of the operations of the system shown in FIG. 1.

Relative movement is provided between image pick-up device 10 and the page or other support upon which the characters to be identified are printed. As mentioned above, in the preferred embodiment, image pick-up device 10 is comprised of a single column of image sensors, and the relative movement between this column of image sensors and the page of characters results in a right-to-left scanning of the characters. It is contemplated that left-to-right scanning may be used, if desired. As also mentioned, the column of image sensors extends across plural lines of characters; and each image sensor is sampled (or polled) in series, resulting in a top-to-bottom and then right-to-left scanning of the characters. As each image sensor is sampled, the dark/light image sensed thereby is detected; and each detected image sample is quantized and "binarized" to represent black or white information in the form of binary "1" or binary "0". Each image sample thus represents a pixel; and that pixel may be black or white as illustrated in FIG. 1A. As right-to-left movement between the image sensors and the optically read character proceeds, the raster image illustrated in FIG. 1A is generated. For the purpose of the present discussion, it is assumed that image pick-up device 10 is scanning the character "S".

It is appreciated that portions of the raster produced by image pick-up device 10 are relatively thick, that is, they are formed of plural pixels. Image thinning control 12, which is described in greater detail in U.S. Pat. Nos. 4,539,704 and 4,574,357, converts such thicker portions of the detected image to a relatively thin image formed of links (or lines) which, preferably, are no thicker than the dimension of one pixel. The links and points which constitute this thinned image then are identified by link identifier 14.

Figure 1B:
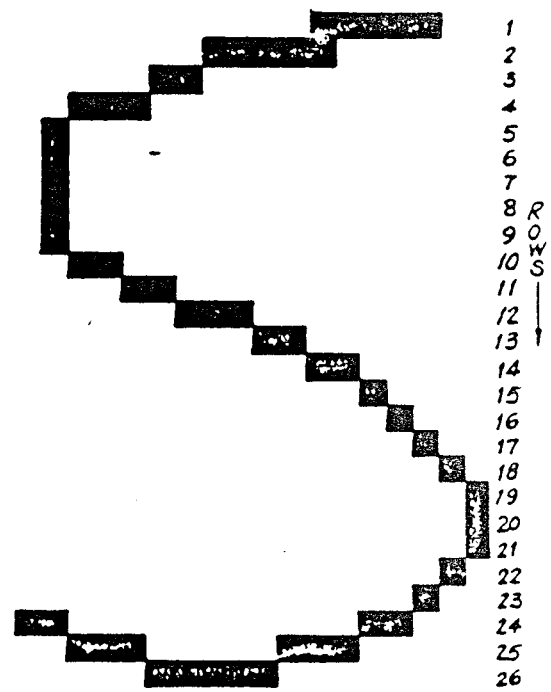

The thinned image shown in FIG. 1B is produced in real time, that is, it is produced while image pick-up device 10 scans a character presented for optical recognition. For the purpose of simplification, the possible presence of whiskers and beaches that might appear in the thinned image have been omitted from FIG. 1B. It will be appreciated, however, that if these artifacts occur, they will be removed by the smoother included in path tracer and feature analyzer 20, as mentioned above.

When the first column of the thinned image is detected, the XY coordinates of the pixels therein (shown as rows 19, 20 and 21 in column 1 of FIG. 1B) are determined and stored. These pixels comprise a link and this link is "tagged" for future reference. The starting and ending points of this tagged link are stored, for example, in look-ahead buffer 18.

When the next column (column 2) of FIG. 1B is scanned, the pixels at rows 18 and 22, respectively, are sensed; and the pixel in row 18 is tagged as part of a second link while the pixel at row 22 is tagged as part of a third link. By the juxtaposition of the pixel at column 2, row 18 to the pixel at column 1, line 19, the starting point of this second link is assumed to be the same as the starting point of the first link. Similarly, by reason of the juxtaposition of the pixel at column 2, line 22 to the pixel at column 1, line 21, the starting point of this third link is assumed to be the same as the ending point of the first link.

When column 3 in FIG. 1B is scanned, the pixel at row 1 is detected and it is assumed that this pixel constitutes the beginning of a fourth link. The XY coordinates of this pixel are stored as the starting point of this fourth link.

Continuing with the scanning of column 3, the pixel at row 17, by reason of its juxtaposition to the pixel at column 2, row 18, is assumed to be a portion of the second link. Likewise, by reason of the juxtaposition of the pixel at column 3, row 23 to the pixel at column 2, row 22, this pixel at column 3, row 23 is assumed to be included in the third link.

The foregoing scanning continues from column to column until all of the links have been tagged, and the starting and ending points of each link have been stored. It will be recognized that, when the pixel at column 10, row 26 is detected, it initially is assumed that this pixel is included in the third link which commenced at column 1, row 21. However, when the pixels at column 11, row 26, column 12, row 26 and column 13, row 26 are detected, the pixels at row 26 spanning columns 9–13 are tagged as being included in, for example, a fifth link. Thus, notwithstanding initial link-tagging of pixels, such tagging may subsequently be changed to more accurately reflect the correct link in which those pixels are disposed.

From the brief description of the manner in which the links and their respective starting and ending points are tagged, identified and stored, it is appreciated that the ending point of one link is, in many instances, the starting point of a connected link. A point to which two and only two links are joined is designated a "class 2" point. However, a point that begins or ends a link, such as the point at column 3, row 1 and the point at column 18, row 24, that is, a "free" point, is designated a "class 1" point. Although, as is apparent from FIG. 1B, the character "S" does not contain a point which forms the juncture of three links, such a point is designated a "class 3" point. Likewise, a point which forms the juncture of four links, such as the intersection in the letter "X", is designated a "class 4" point. As mentioned above, alphanumeric characters preferably are grouped in sets, and each set is specified by the number of "class 1" and "class 3" points common to all of the characters in that set. For the purpose of such set determination, a "class 4" point is interpreted as being equal to two "class 3" points.

As will be described more fully below, the beginning of a binarized image is detected when a "black" pixel first is sensed after sensing at least three "white" pixels in a "neighborhood" that precedes that black pixel. This represents the beginning of a block within which the character is positioned. Likewise, the end of the image is detected when, after sensing a black pixel, at least three white pixels in a neighborhood that follows that black pixel are detected. This represents the end of the character block.

The aforementioned tagging, or identification, of each link, and the identification and storage of the critical points (i.e. the "class 1", "class 2", and "class 3" points) of a scanned image are determined by link identifier 14. Although not shown in FIG. 1B, it may turn out that a character is improperly formed or, because of dirt or noise, or because of some other interference, a pixel which should be "black" erroneously is "white", or blank. This is referred to as a "soft" break in the image. For example, the black pixel at column 4, line 16, may be omitted. In that event, link identifier 14 might erroneously identify the pixel at column 3, line 17 as a "class 1" point and the pixel at column 5, line 15 as a "class 1" point. These erroneously identified "class 1" points might be assumed to be the end and beginning, respectively, of separate links. In actuality, however, such separate links should be included in the same broken link; and the pixel at column 4, line 16 should be black. Link connector 16 functions to interpolate such a blank pixel found at column 4, line 16 and serves to "fill in" this soft break. Such interpolation will be described hereinbelow in conjunction with the matrices illustrated in FIGS. 6A and 6B.

Look-ahead buffer 18 temporarily stores the link-tag preliminarily assigned to each pixel, subject to a change in the link-tag as further columns of the image are scanned and examined. In accordance with the example mentioned above, when the pixel at column 9, line 26 is detected, this pixel initially is tagged as being included in the third link; and look-ahead buffer 18 stores this initial tag. Likewise, when the pixel at column 10, line 26 is detected, look-ahead buffer 18 tags this pixel as being included in link 3. However, after the pixels at column 12, row 26 and column 13, row 26 are detected, the initial tags of the pixels at row 26, columns 9, 10 and 11 are expected to be changed over from link 3 to, for example, link 5. As will be described, look-ahead buffer 18 advantageously has the capacity to store at least seven columns of pixel data. That is, the link-tags of up to seven columns of pixels can be stored in the look-ahead buffer. Alternatively, and if desired, the storage capacity of the look-ahead buffer may be increased to any desired size, including a storage capacity capable of storing all of the pixels included in a typical character (e.g. 20–30 columns of approximately 1024 rows in each column). As determined by link identifier 14 in conjunction with link connector 16 and look-ahead buffer 18, the XY coordinates of the "class 1", "class 2" and "class 3" points which are detected in the scanned image are supplied to path tracer and feature analyzer 20. Data representing the links to which each "class 1", "class 2" and "class 3" point is connected i. e. link-tag information) are supplied to the path tracer and feature analyzer.

The XY coordinate data supplied to path tracer and feature analyzer 20, together with the link-tag data is sufficient to reproduce the scanned image by converting such XY coordinate data to viewable images. Of course, as mentioned previously, each critical point represented by its XY coordinates is identified as a "class 1" or a "class 2" or a "class 3" point. It is appreciated that each "class 3" point is joined, by means of a respective link, to yet another point which, of course, may be a "class 1" or a "class 2" or a "class 3" point. Since each "class 3" point is formed by the juncture of three links, it is recognized that three separate paths may be traced from each "class 3" point. The points which are joined to a particular "class 3" point may be viewed as the free ends of spokes extending outwardly from this "class 3" point and the identities of such free ends are stored in a particular, predetermined order. In the preferred embodiment, this order is a clockwise order such that the points which are joined to the "class 3" point in question are identified in this clockwise order. It is appreciated that this clockwise order may be determined easily by referring simply to the XY coordinates of each such point. A particular example of how this clockwise arrangement is used will be described hereinbelow in conjunction with the example shown in FIG. 4.

After the identities of the remote points to which each "class 3" point is joined are arranged in the aforementioned clockwise order, paths are traced from, for example, one "class 1" point to another. As each path is traced, the change in the direction of that path when passing from one critical point to another is sensed as a function of changes in the X and Y coordinates. Such changes are recognized as either "convex" or "concave" changes. Convex changes are substantially ignored; but concave changes represent the presence of a bay. For the purpose of determining whether a change in the traced path is convex or concave, a link extending from a previous point to the present point is temporarily assumed to be the x-axis (with the present point coinciding with the origin thereof), and the link extending from the present point to the next point in the traced path is examined to determine if it extends into either the first or second quadrant relative to that x-axis. If so, the path from the previous point to the present point and thence to the next succeeding point is viewed as concave and, thus, is indicative of a bay. If, when continuing the traced path a "class 1" point is reached, the total concavity of this traced path is analyzed, based upon the overall changes in the X and Y coordinates which are encountered, to determine the direction in which this bay faces. As a result of this investigation, the bay is categorized as a "bay north", a "bay northeast", a "bay east", a "bay southeast", a "bay south", a "bay southwest", a "bay west", or a "bay northwest". As will be described below, suitable decimal digits may be assigned to each of the aforementioned bay classifications to provide easy identification thereof.

Preferably, the presence of a concavity in a traced path is determined by examining only three successive points, as aforementioned. It may turn out that what should have been detected as a relatively straight line is, in actuality, sensed as a number of interconnected links with relatively small changes in direction from link to link. Rather than sensing relatively small concavities (referred to as "beaches") that may be present among every three links, path tracer and feature analyzer 20 includes a smoother that operates to ignore such beaches and effectively replaces them with a single link. A beach is detected as a function of its size (typically less than 1/16 of the overall area of the character) and its orientation with respect to preceding and following concavities and convexities, as well as the sizes of those concavities and convexities.

After tracing paths from one "class 1" point to another, or if there are no "class 1" points, paths which had not been traversed previously are traced commencing at a "class 3" point (or if there are no "class 3" points, path tracing begins at a "class 2" point). Typically, the tracing of such previously untraced paths from a "class 3" point results in a circuitous path, i.e. the particular "class 3" point from which this tracing commences is the very same "class 3" point upon which this path-tracing ends. The XY coordinates of the respective points included in a sensed lagoon represent the position of the lagoon relative to previously detected bays.

If, after traversing the aforementioned circuitous path from a "class 3" point there exist any further paths which had not yet been traversed, such further paths are traversed in the manner just described. Typically, this further path-traversal also results in the tracing of a circuitous path; and the existence and relative location of the lagoon formed by this additional circuitous path likewise is determined.

As a result of the operation of path tracer and feature analyzer 20, the relative locations of bays and lagoons are ascertained. For example, when the image illustrated in FIG. 1B is analyzed by the path tracer and feature analyzer, the resultant analysis determines the existence of a bay east disposed on top of (hereinafter "above") a bay west. That is, the analysis of this image results in the conclusion that a bay facing in the eastward direction is disposed above a bay facing in the westward direction. These identified geographical features are compared in comparator 22 to a set of geographical features which are represented by data stored in dictionary 24. The particular set of stored geographical features to which the detected geographical features are compared is determined by the number of "class 1" and "class 3" points of which the scanned image is comprised. From FIG. 1B, it is appreciated that the character "S" includes two "class 1" points and no "class 3" points. In the set of characters formed of two "class 1" points and no "class 3" points stored in dictionary 24, the characters "S" and "5" both contain a bay east over a bay west. However, ambiguities are resolved on the basis of metric characteristics (such as the angles formed by intersecting links) and location of the bays, and the scanned image is recognized as the character "S".

Figure 1C:
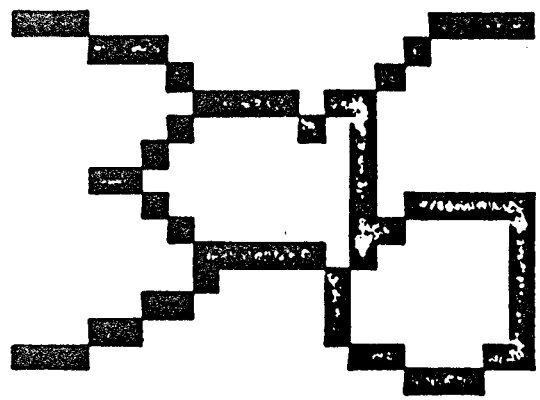

Let it now be assumed that the arrangement of images illustrated in FIG. 1C is presented for recognition. Empirically, it is appreciated that this arrangement is the numeral "36"; but with undesired connections between the digit "3" and the digit "6". Such erroneous connections will prevent the proper recognition of the characters which constitute "36". During the path tracing operation carried out by path tracer and feature analyzer 20, the following geographical features will be detected: a bay east above a lagoon, this combination being next to a bay north above a lagoon which, in turn, is above a bay south, and this arrangement is next to a bay west above a bay west. The particular set of characters to which this combination of geographical features is compared is not found in dictionary 24. The image of FIG. 1C is seen to be formed of three "class 1" and five "class 3" points. As will be appreciated from the description set out below with respect to FIG. 2, these critical points establish the set of characters to which the detected geographical features are compared; and the geographical features for this set, as stored in dictionary 24, are completely different from the detected features. However, character separator 26, in conjunction with comparator 22 and dictionary 24, indicates that the combination of a bay east above a lagoon constitutes at least one character whose geographical features are stored in dictionary 24. Consequently, character separator 26 assumes that any links which extend from an image whose geographical features are constituted by a bay east above a lagoon are erroneous links. Accordingly, the illustrated links between the numerals "3" and "6" are disregarded; and the data blocks representing these two separate and independent images are analyzed once again to ascertain the number of "class 1" and "class 3" points in each and then the geographical feature analysis by the path tracing operation is repeated. Now, the first image is detected as having one "class 1" point and one "class 3" point and, moreover, consists of a bay east above a lagoon. Comparator 22 determines that this scanned image corresponds to the numeral "6".

Next, the second of the scanned images is recognized as containing two "class 1" and no "class 3" points Furthermore, by reason of the geographical feature analysis mentioned above, it is concluded that this image consists of a bay west above a bay west. When the appropriate set of characters stored in dictionary 24 (i.e. the set consisting of only two "class 1" points) is accessed, comparator 22 recognizes this scanned image as the numeral "3".

Thus, it is appreciated that character separator 26 functions to break, or ignore, those links between two otherwise independent images, thus permitting those images to be recognized. Furthermore, the character separator serves to identify such improper linkage between images.

Rearranger 28 will be described below and, for the moment, further explanation is not provided.

Character reconstructor 29 is coupled to rearranger 28 and is supplied with at least one out of range data block. That is, in the event of a hard break present in a scanned image, as mentioned above, rearranger 28 supplies the character reconstructor with a data block whose overall size is less than the size of blocks containing image data representing characters that have been recognized. Based upon the XY coordinates of pixels in this out of range block and the XY coordinates of pixels in adjacent blocks, character reconstructor 29 senses the distance between this block and the block closest thereto. The out of range block then is joined to that closest block by inserting a link therebetween (referred to as a "joint"), and the overall size of the joined blocks is examined. If this resultant block is within range, the image data therein is fed back to path tracer and feature analyzer 20 for analysis in the manner mentioned above. However, if the overall size of the resultant block is too large, the joint is not established. Rather, the small, out of range block is joined to another adjacent block and the foregoing examination and analysis is repeated.

Thus, a hard break is detected when rearranger 28 supplies an out of range data block to character reconstructor 29 and the character reconstructor "fills in" this break by joining the out of range block to an adjacent block which may or may not be an out of range block itself. If no out of range blocks are detected, FIG. 1 indicates that character reconstructor 29 may be bypassed; and the characters which are rearranged into proper order by the rearranger are simply supplied to output device 30.

Output device 30, as mentioned above, may comprise a conventional device for displaying, communicating or otherwise utilizing the data representing the recognized characters. The output device forms no part of the present invention per se and, in the interest of brevity and simplification, further description thereof need not be provided Turning to FIG. 2, there is illustrated a chart representing the sets of characters containing the indicated "class 1" and "class 3" points (it being recalled that a "class 4" point, such as the intersection in the character "X", is construed as two "class 3" points). In this chart, the abscissa represents the number of "class 3" points and the ordinate represents the number of "class 1" points included in a character.

It is appreciated that the set of characters formed of no "class 1" points and no 'class 3" points consists simply of the letters "D" and "O". The set of characters formed of two "class 1" points and no "class 3" points is seen to be those letters and characters included in the rectangle defined by the intersection (0,2), that is, in the rectangle defined by x=0 and y=2 in the illustrated chart. These characters are seen to be "basic" characters without serifs or embellishments. It is recognized that the same letter might be included in two or more sets of characters because that letter may be an embellishment of the basic letter. An example of this is shown as the letter "B" which appears without serifs in the set formed of no "class 1" points and two "class 3" points, is provided with one serif in the set formed of one "class 1" point and three "class 3" points and is provided with two serifs in the set formed of two "class 1" points and four "class 3" points.

It is appreciated that the operation of comparator 22 is significantly simplified merely by requiring the detected geographical features of an image to be compared to the geographical features of a relatively small number of characters (i.e. the geographical features of the characters stored in a particular set) rather than comparing the detected geographical features to all possible geographical features of all possible characters. By utilizing point classifications (i.e. the number of "class 1" and the number of "class 3" points included in a scanned image) together with the detected geographical features of the scanned image, the need for a template comparison of reference characters to the scanned image is obviated.

Furthermore, to facilitate a representation of the relative locations, or juxtapositions, of the detected geographical features, those features are represented in matrix form, as will be described. Matrix representation is easily facilitated by suitable programming of a processor, such as a minicomputer, thereby describing the features present at, for example, different "class 3" points included in a scanned character. The matrices which represent the features at respective "class 3" points are summed to form an overall matrix which describes the geographical features included in the character. This overall matrix, which is produced by the processor, easily is compared to pre-established matrices stored in dictionary 24 to identify the scanned character.

Figure 3A:
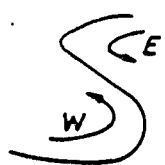
FIGS. 3A-3F are examples of the geographical features included in representative alphanumeric characters.

FIGS. 3A–3F are representative examples of typical alphanumeric characters and the particular geographical features of which these characters are formed. As shown in FIG. 3A, and as has been described above with respect to FIG. 1B, the letter "S" is formed of a bay east above a bay west. It also is noted that this character consists of two "class 1" points and no "class 3" points.

Figure 3B:

The character "R" of FIG. 3B is formed of a bay southeast next to the combination of a lagoon above a bay south. Furthermore, this character includes two "class 1" points and two "class 3" points. From the chart shown in FIG. 2, it is seen that this particular set of characters includes eleven separate characters; but only one of these eleven separate characters is formed of a bay southeast next to the combination of a lagoon above a bay south.

Figure 3C:
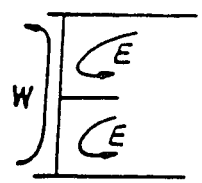
Figure 3D:
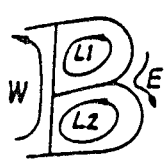
Figure 3E:
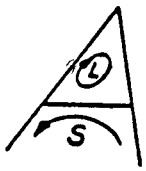
Figure 3F:

Similarly, the letter "E" of FIG. 3C contains two serifs and is formed of five "class 1" points and three "class 3" points, and consists of a bay east above a bay east, this combination being next to a bay west. From the chart shown in FIG. 2, one and only one character contains these geographical features in the set defined by five "class 1" and three "class 3" points. The character "B" shown in FIG. 3D will be described in connection with a detailed analysis thereof, as set out below. It is noted, however, that this character contains two serifs and is formed of two "class 1" points and four "class 3" points; and in the appropriate set illustrated in FIG. 2, the letter "B" is the only character formed of a bay east next to the combination of one lagoon over another lagoon, this combination being next to a bay west. Similarly, the character "A" shown in FIG. 3E is illustrated as a basic character (with no serifs) and is the only character included in the set defined by two "class 1" points and two "class 3" points formed of a lagoon above a bay south. Likewise, the numeral "6" shown in FIG. 3F is the only character included in the set formed of one "class 1" point and one "class 3" point formed of a bay east above a lagoon. It is seen that the character "b", which also is included in this set, differs from the numeral "6" in that the letter "b" is formed of a bay northeast above a lagoon. This small but important difference in the direction of a bay, that is, the direction in which the bay opens, is important to proper recognition of a scanned character.

Figure 3G:
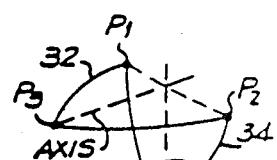
FIG. 3G is helpful in understanding how the direction of a bay is characterized.

In characterizing the direction of a bay, three points which define that bay are examined: the two points which define its "mouth" and the one point which lies on or near the "axis" of the bay. It will be appreciated that the axis intersects the mouth from a minimal point on the bay. As an example, depending upon the direction of this axis and the location of the minimal point, a bay may open in the north or northeast direction even though the same two points define its mouth. This is represented in FIG. 3G wherein points $P_1$ and $P_2$ define the mouth of bay 32 and also of bay 34. Point $P_3$ is the minimal point of bay 32 and lies on the axis of that bay. Likewise, point $P_4$ is the minimal point of bay 34 and lies on the axis of bay 34. However, with the common mouth defined by points $P_1$ and $P_2$, bay 32 opens to the northeast and bay 34 opens to the north. Minimal points $P_3$ and $P_4$ thus characterize the directions of these bays.

Figure 4:
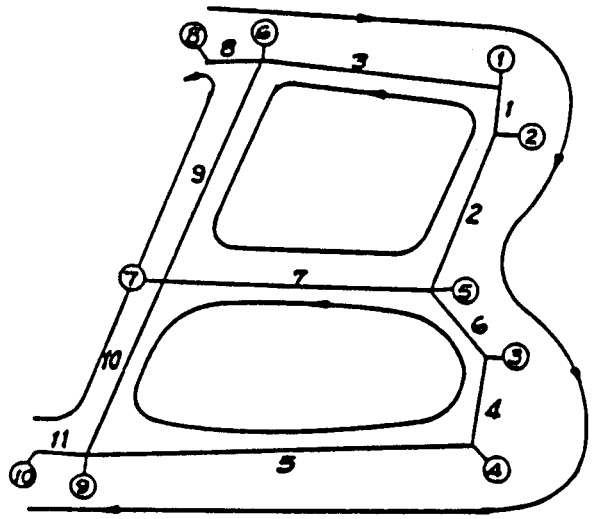
FIG. 4 is useful in understanding the manner in which an alphanumeric character ("B") is analyzed and identified.
Figure 5:
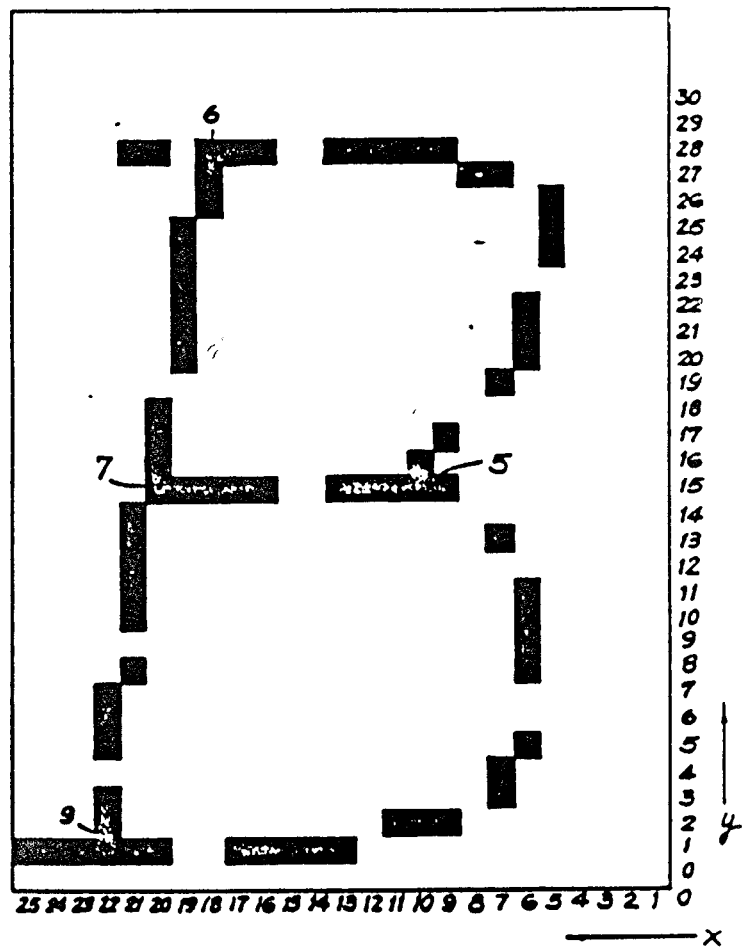
FIG. 5 represents a typical pixel arrangement of a scanned alphanumeric "B" with "soft" breaks.

FIG. 4 is a representation of the character "B" that, as an example, had been presented to link identifier 14 and link connector 16 as the thinned image represented in FIG. 5. The manner in which the image shown in FIG. 5 is interpolated to be analyzed in accordance with the representation shown in FIG. 4 will be described below. The present description is intended to facilitate an understanding of the manner in which path tracer and feature analyzer 20 operates.

It should be recognized that when the binarized image shown in FIG. 5 is scanned by link identifier 14 and link connector 16, the various points which define the beginning and ends of each link are detected; and the XY coordinate of each is stored in a suitable memory. Based upon such XY data, it is known that point 1 (FIG. 4) is linked to points 6 and 2, that point 2 is linked to points 1 and 5, that point 5 is linked to points 2 and 3, that point 3 is linked to points 5 and 4, and so on. It also can be ascertained that a particular point which is linked to three points is a "class 3" point. The "class 3" points shown in FIG. 4 are seen to be points 5, 6, 7 and 9. With respect to point 5, it is seen that this point is linked by respective links to points 7, 2 and 3. It is recalled that the identities of the points to which this "class 3" point is linked are arranged in clockwise order. Commencing, arbitrarily, with point 7, the clockwise order of the points to which point 5 is linked consists of points 7, 2 and 3.

Likewise, the clockwise order of the points to which point 6 is linked is seen to be points 8, 1 and 7. In similar fashion, the clockwise order of the points to which point 7 is linked is points 6, 5 and 9. Finally, the clockwise order of the points to which point 9 is linked is points 10, 7 and 4. Thus, the "class 3" points are identified and the identities of those points to which each "class 3" point is linked are stored in a suitable memory in clockwise order.

Next, all paths extending from one "class 1" point to another are traced. From the scanning of the binarized image shown in FIG. 5, the "class 1" points are identified as points 10 and 8. While there is no particular "class 1" point from which the path tracing operation should commence, it is assumed, merely for convenience, that this operation Point 10 is linked to point 9. Point 9 is a "class 3" point and, from this point, two different paths may be followed. However, in view of the clockwise order of points which are stored for "class 3" point 9, it is appreciated that a path which arrives at this point from point 10 should depart from this point to point 7. Thus, the path 10-9-7 is traced.

In view of the change in X and Y data from point 10 to point 9 and from point 9 to point 7, the relative concavity (or convexity) of this path is examined. As mentioned above, the link from point 10 to point 9 is assumed to reside on the x-axis with point 9 as the origin. The link from point 9 to point 7 is seen to extend into the first quadrant and, thus, the path 10-9-7 represents a concavity.

Upon arriving at point 7, a "class 3" point, two different paths may be followed. However, in view of the clockwise arrangement of points linked to point 7, it is appreciated that a path arriving at point 7 from point 9 must leave point 7 to point 6. The path 9-7-6 now is followed.

On arriving at point 6, alternative paths may be traced from point 6 to point 8 or to point 1. From the aforementioned clockwise order of points to which point 6 is coupled, it is appreciated that, when a path is traced from point 7 to point 6, the next following path departs from point 6 to point 8. Now, if the path 7-6 is disposed along the x-axis (with point 6 coincident with the origin), it is seen that the path 6-8 extends into the second quadrant. Hence, it is concluded that the path 7-6-8 exhibits a concavity.

In view of the concavities exhibited by paths 10-9-7 and 7-6-8, a bay is formed by the path traced from "class 1" point 10 to "class 1" point 8. Furthermore, by examining the mouth of tis bay defined by points 10 and 8, and by examining the minimal point on this bay, which is point 7, it is concluded that this bay faces in the westward direction. Hence, this bay is identified as a bay west.

Another path extends between "class 1" point 8 and "class 1" point 10. Commencing at point 8, this point is linked to point 6; and, as is recalled from the clockwise order of points to which point 6 is connected, a path arriving from point 8 departs in the direction to point 1.

From the XY coordinate data that is stored with respect to the character shown in FIG. 4 it is known that point 1 is linked to point 2; and the path 6-1-2 is examined for concavity. If the path 6-1 is disposed along the x-axis (with point 1 coincident with the origin), it is seen that the path 1-2 does not extend into the first or second quadrant. Hence, the path 6-1-2 is determined to be a convex path.

Continuing from point 2 to point 5, the path 1-2-5 also is examined for concavity. It is appreciated from the foregoing description of determining whether a three-point path is concave or convex that the path 1-2-5 is convex.

When arriving at point 5 from point 2, the next path to be followed extends to point 3. The determination that the path 5-3 rather than the path 5-7 should be followed is recognized from the clockwise order of points to which point 5 is linked.

Now, examining the path 2-5-3, it is appreciated that this path exhibits a concavity. Thus, it is determined that path 2-5-3 defines or is at least included in a bay.

Continuing from point 3, this point is linked to point 4 and thence the path extends to point 9. Analysis of the paths 5-3-4 and 3-4-9 result in the conclusion that these paths exhibit convexities.

From point 9, the clockwise order of points to which this point is linked results in the conclusion that the path then extends to point 10. This completes a path tracing from "class 1" point 8 to "class 1" point 10.

From the XY coordinate data representing points 1, 2, 5, 3 and 4, and particularly by examining the points which define the mouth of the bay and the minimal point on that bay, it is concluded that the bay formed by this path opens in the eastward direction. Hence, this bay is identified as a bay east; and its location is ascertained by its XY coordinates.

From the foregoing path tracing between the "class 1" points, it is appreciated that several paths which include the "class 3" points 5, 6, 7 and 9 have not been traced. That such untraced paths remain is determined from examining the XY data representing these "class 3" points and the XY data representing each point connected thereto which has been traced. Now, the remaining untraced paths are followed. As an example, commencing at point 5, let it be assumed that this point is reached from point 7. From the clockwise order of points to which point 5 is connected, it is recalled that, when point 5 is reached from point 7, the next path extends to point 2. Then, continuing, point 2 is connected to point 1 and point 1 is connected to point 6. If point 6 is reached from point 1, the next following path from point 6 extends to point 7. Likewise, when point 7 is reached from point 6, the next following path extends to point 5. Now, by tracing a path commencing at point 5, a circuitous path is followed which returns to point 5. Hence, a lagoon is detected.

Notwithstanding the tracing of the path which forms the above-mentioned lagoon, there still remains an untraced path which includes class 3 points 5, 7 and 9. Returning once again to point 5, and proceeding in a counterclockwise direction, if it is assumed that point 5 is reached from point 3, then the path from point 5 extends to point 7. This path then extends to point 9 and, thereafter, to point 4. Point 4 is linked to point 3 and this point, in turn, is linked to point 5. Once again, a circuitous path has been traced, and this is determinate of the presence of a lagoon.

From the preceding discussion, it will be apparent that each and every path which includes a "class 3" point now has been traced. As a result of such path tracings, the presence of a bay east, a bay west and two lagoons has been detected. From the XY coordinates representing the "class 3" points and those other points to which each "class 3" point is connected, it is determined that a bay east is next to the combination of one lagoon over another, and this combination of lagoons is, in turn, next to a bay west. From the chart shown in FIG. 2, the only character included in the set defined by two "class 1" points and four "class 3" points which includes this particular arrangement of geographical features is the letter "B". Thus, the character shown in FIG. 4 is recognized as the letter "B".

As mentioned above, when scanning a character to be recognized, it may turn out that, after the thinning process carried out by image thinning control 12, one or more pixels which are included in a particular link nevertheless remain "blank". For example, in binary notation, a binary "0" may be used to represent background and a binary "1" may be used to represent the presence of a mark. A blank pixel thus corresponds to a binary "0" and a "filled in" pixel corresponds to a binary "1". An example of blank pixels included in a thinned image being scanned is illustrated in FIG. 5. It will be appreciated that the pixel whose XY coordinates are (6, 27), as indicated by the columns (X) and rows (Y) of FIG. 5, is blank but should be filled in (that is, this pixel is represented as a "0" but should, in fact, be represented as a "1"). Similarly, the pixel at location (6, 23) or the pixel at location (5, 23) should be filled in. Other examples of blank pixels which should be filled in are evident from even a cursory inspection of FIG. 5. Such blank pixels are referred to as "soft breaks" in the image.

The manner in which these soft breaks are filled in for the purpose of completing a link will be described in conjunction with the matrices shown in FIGS. 6A and 6B.

It is recalled that the thinned image (or, alternatively, data representing the thinned image) is scanned in a top-to-bottom and right-to-left direction. Preferably, a column of image sensors which is dimensioned to span at least the entire height of an image is moved from right to left to sample the image in successive columns. At each sampling location, the image sensors are polled sequentially from the top of the column to its bottom. Thus, in the embodiment shown in FIG. 5, the pixels disposed at x=5, that is, column 5, are sensed in sequence such that the pixels at locations (5, 26), (5, 25) and (5, 24) are sensed. Then, the column of image sensors advances to sense the pixels located in column 6 and then the pixels in column 7, and so on. As the illustrated image is scanned column-by-column, representations of the sensed pixels are stored in, for example, corresponding memory locations in a look-ahead buffer. In the preferred embodiment, this look-ahead buffer is capable of storing pixel information disposed in seven successive columns. Alternatively, the look-ahead buffer might have a storage capacity sufficient to store all of the pixel information contained in the entire image which is scanned.

As pixel information is entered into the look-ahead buffer, a "neighborhood" surrounding each filled in pixel, that is, a pixel represented as a binary "1", is analyzed to determine the proximity of that pixel to other filled in pixels. For example, the pixel at location (5, 26), the first pixel to be sensed in the image, is examined. Examination is carried out by using the matrix shown in FIG. 6A as follows: the filled pixel at (5, 26) is placed at the origin of this matrix. Then, the relative distance between this pixel and each of the two closest filled pixels at locations (5, 25) and (7, 27) is determined. If the matrix shown in FIG. 6A now is superimposed over these pixels, it is seen that the relative distance between the pixel at location (5, 26) and the pixel at location (5, 25) is represented as the dimensionless numeral 1; and the distance between the pixel at location (5, 26) and the pixel at location (7, 27) is represented by the dimensionless number 4. From FIG. 6A, it is seen that the pixel at location (5, 25) is located in the third quadrant $Q_{III}$ relative to the origin, and the pixel at location (7, 27) is located in the second quadrant $Q_{II}$. In view of the proximity to each other of the pixels at locations (5, 25) and (7, 27), examination is made utilizing the matrix shown in FIG. 6B to determine the relationship therebetween. This matrix serves as a guide as to whether the pixel at (7, 27) in quadrant $Q_{II}$ should be connected to the pixel at (5, 25) in quadrant $Q_{III}$. In this regard the distance from the pixel at the origin (5, 26) to the pixel in quadrant $Q_{II}$ is measured along the abscissa labeled $Q_I$ in FIG. 6B, and this has been found to be the dimensionless number 4. Likewise, the distance from the origin to the pixel in quadrant $Q_{III}$ is measured along the ordinate labeled $Q_{I+1}$ in FIG. 6B, and this has been found to be the dimensionless number 1. The intersection of these two points in the FIG. 6B matrix is represented by the dimensionless number 6, and represents the distance between the pixels at locations (5, 25) and (7, 27). Since this distance is greater than the distance from the pixel at (5, 26) to the pixel at (5, 25) and also is greater than the distance from the pixel at (5, 26) to the pixel at (7, 27), the pixels at (5, 25) and (7, 27) are not joined. However, the pixel at (5, 26) is close enough to be joined to the pixel at (7, 27); and the pixel location (6, 27) is artificially filled in to close the "soft break". The look-ahead buffer is provided with information representing that the pixel at (6, 27) is artificially filled in.

Next, the filled pixel at location (5, 25) is examined. Since this pixel is adjacent two filled pixels, a soft break is not present therebetween. However, the pixel at location (5, 24) is adjacent one filled pixel at (5, 25) and a blank pixel at (5, 23) and also a blank pixel at (6, 23). Hence, a soft break is detected, and the pixel at (5, 24) is analyzed by use of the matrix shown in FIG. 6A. As before, the origin is placed at the pixel in question, i. e. at location (5, 24), and the distance from this pixel to the pixel at (5, 25), which already has been examined, is represented by the dimensionless number 1 in quadrant $Q_I$ Also the distance from the pixel at (5, 24) to the pixel at 6, 22) is represented by the dimensionless number 4 in quadrant $Q_{III}$. The matrix of FIG. 6B is used to determine if pixels in adjacent quadrants should be connected; and since quadrants $Q_I$ and $Q_{III}$ are not adjacent, this matrix is not relied upon herein. Nevertheless, in view of the relative proximity of the pixels at (5, 24) and (6, 22), these two pixels should be joined, and the soft break therebetween is closed by filling in the pixel at (5, 23). The look-ahead buffer is provided with information that the pixel at (5, 23) is artificially filled in.

Since there are no other filled pixels remaining for examination in column 5, the analysis of this column is completed. Next, a similar analysis of the pixels in column 6 is carried out. First, the filled pixel at (6, 22) is examined, and this pixel is found to be adjacent the artificially filled pixel at (5, 23) and the filled pixel at (6, 21). Here too, no soft break is detected. Likewise, each of the pixels at (6, 21) and at (6, 20) is adjacent two filled pixels, thus indicating the absence of a soft break.

The next filled pixel in column 6 to be examined is at (6, 11). This pixel is adjacent the pixel at (6, 10) in quadrant $Q_{III}$ and is separated from the pixel at (7, 13) in quadrant $Q_{II}$. From the matrix of FIG. 6A, the distance between the pixels at locations (6, 11) and (7, 13) is the dimensionless number 5. Of course, the distance between the pixels at locations (6, 11) and (6, 10) is the dimensionless number 1. Since the closest pixels to the pixel at location (6, 11) are in adjacent quadrants $Q_{II}$ and $Q_{III}$, the matrix of FIG. 6B is used to determine if those pixels should be joined. The abscissa $Q_I$ is equal to the distance 5 and the ordinate $Q_{I+1}$ is equal to the distance 1. The intersection of these values is seen to be equal to 0, thus indicating that the $Q_{II}$ pixel at (7, 13) should not be joined to the $Q_{III}$ pixel at (6, 10). But, the distance 5 is sufficiently close to join the pixel at (6, 11) with the pixel at (7, 13); and the pixel at (6, 12) is artificially filled to close the soft break.

The foregoing analysis of filled pixels continues, column-by-column, to detect soft breaks and to join pixels that are separated by a soft break. It will be appreciated that if two separated pixels nevertheless lie within the matrix of FIG. 6A, that is, if one pixel is disposed at the origin and the other is within the quadrant $Q_{II}$ or $Q_{III}$ and is spaced therefrom by the dimensionless number 7 or less, a soft break that should be closed is detected. If the distance between pixels is greater than 7, it is assumed that the end of an image block has been reached. The confines, or dimensions, of a block thus are established, irrespective of the orientation of the image, and data representing each critical point and each link are supplied to path tracer and feature analyzer 20. As will be recognized, this permits italics to be interpreted because the limitation of segmentation based upon the sensed density of pixels in the horizontal and vertical directions, mentioned earlier in this specification, does not present a problem to detecting the end of one character and the beginning of another. The arbitrary beginning and end of each image block is sensed.

From the XY coordinates of adjacent pixels, a determination of the link-tag of each pixel is made. Relatively small changes in the Y coordinate as the X coordinate changes unit by unit, as in the pixels disposed in rows 1 and 2, generally represent the same link. Likewise, relatively small changes in the X coordinate as the Y coordinate changes unit by unit, as in the pixels disposed in columns 5 and 6, generally represent the same link. Also, a unit change in the X coordinate accompanied by a unit change in the Y coordinate, as in the pixels at (6, 20), (7, 19), (8, 18), (9, 17) and (10, 16), generally represent the same diagonal link. Hence, the link tags illustrated in FIG. 4 may be determined for each pixel.

Also, from the foregoing analysis and filling in of blank pixels, particular coordinates will be found which represent the end of one link and the beginning of another. Such "class 2" points are identified as well as the "class 3" points which, of course, are points at which three (or more) separate links are joined. By utilizing the look-ahead buffer described above and the analysis matrices shown in FIGS. 6A and 6B, the XY coordinate data of the respective points included in the scanned character, as well as tags representing the particular links joined by such points are identified and stored. Then, the analysis mentioned above in conjunction with FIG. 4 may be carried out.

It will be recognized that the matrix shown in FIG. 6A, when superimposed onto pixel data, separates that data into pixels that have already been examined, i.e. pixels which lie in quadrants $Q_I$ and $Q_{IV}$ (that is, these pixels will already have been scanned and analyzed by the time the origin is superimposed over the pixel in question), and pixels that have not yet been examined, i.e. pixels which lie in quadrants $Q_{II}$ and $Q_{III}$. The $Q_I$ and $Q_{IV}$ quadrants contain information of the "past" and the $Q_{II}$ and $Q_{III}$ quadrants contain information of the "future".

Figure 5A:
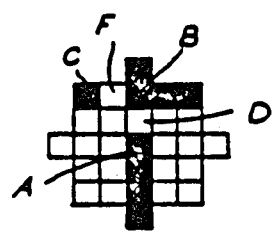
FIGS. 5A and 5B are useful in understanding the manner in which soft breaks are filled.

The use of the matrix shown in FIG. 6B, as mentioned above, may serve as a guide to determine if two unconnected pixels are separated by a soft break and should be joined. The examples shown in FIGS. 5A and 5B further explain this. In FIG. 5A, the pixels at locations A, B, C, D and E are superimposed onto the matrix of FIG. 6A. At the time that pixel B was analyzed, it was found that a soft break was present between pixel B and pixel A and a soft break also was present between pixel B and pixel C. Hence, pixels B and A will be joined by artificially filling pixel D, and pixels B and C likewise will be joined by artificially filling pixel F. The artificial filling of blank pixels is stored in the look-ahead buffer. Subsequently, when pixel A is examined, pixel C in quadrant $Q_{II}$ is sensed. A decision must be made whether to fill pixel E so as to join pixels A and C. This presents three possible connections: pixels ADB, pixels BFC and pixels AEC. The distances between pixels AB and between pixels AC are found, from the matrix of FIG. 6A, to be $AB=3$ and $AC=6$. Pixel B is located in quadrant $Q_I$ and pixel C is located in quadrant $Q_{II}$. Turning to the matrix in FIG. 6B, $AB=Q_i=3$ and $AC=Q_{i+1}=6$. The intersection of $Q_i$ and $Q_{i+1}$ in the FIG. 6B matrix means $BC=3$. Since BC is less than AC, the pixels AEC are not connected. Pixel A is connected only to pixel B; it is not linked to pixel C.

Figure 5B:
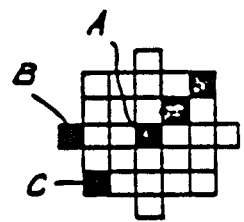

In the example of FIG. 5B, pixel A is analyzed. A soft break is assumed between pixels AC and pixels AB. The distance between pixels AB is 7 and the distance between pixels AC is 6. It would seem that pixel A should be connected both to pixel B and to pixel C; but subsequently when pixel C is analyzed, it might be concluded that pixel C also should be connected to pixel B. The possible future connection is examined now by referring to the matrix of FIG. 6B. Pixel B is located in quadrant $Q_{II}$ and pixel C is located in quadrant $Q_{III}$. Hence, $AB=Q_i=7$ and $AC=Q_{i+1}=6$. The intersection of $Q_i$ and $Q_{i+1}$ in the FIG. 6B matrix means that $BC=5$. Thus, when pixel C is analyzed, it will turn out that pixel C should be connected to pixel B. The examination of pixel A results in the connection of pixel A only to pixel C because the distance AC is less than the distance AB. Only the shortest distance from the pixel under examination is connected.

FIG. 7 is a diagrammatic representation of the decimal notations utilized to identify a lagoon (decimal notation "0") or a bay. Depending upon the direction in which the bay opens, a different decimal notation is used. Thus, a bay north is represented by the decimal notation "1", a bay northeast is represented by the decimal notation "2", a bay east is represented by the decimal notation "3", a bay southeast is represented by the decimal notation "4", a bay south is represented by the decimal notation "5", a bay southwest is represented by the decimal notation "6", a bay west is represented by the decimal notation "7" and a bay northwest is represented by the decimal notation "8". These decimal notations are utilized by the software for the purpose of comparing the geographical features sensed in a scanned character to the geographical features stored in dictionary 24 (FIG. 1, as described above).

It is appreciated that, in some instances, when a thick, non-uniformly printed character scanned by image pick-up device 10 is thinned by image thinning control 12, unexpected lagoons may be present. An example of this is shown in FIG. 8A wherein the expected "class 3" point that links the usual bay east with the lagoon of numeral "6" is replaced by a small lagoon (referred to as a "puddle") that is formed when the thick character is thinned about a "hole" that appears within the thick stroke. (The hole generally is larger than a single blank pixel.) Analysis of the character shown in FIG. 8A in accordance with the procedure discussed above will result in a character formed of one "class 1" point and three "class 3" points; and by tracing the paths formed of the critical points of this character, the resistant geographical features will appear as a bay east above a lagoon, this combination being next to another lagoon. Such geographical features are not found in any character included in the set formed of one "class 1" and three "class 3" points.

Additionally, FIG. 8A illustrates an upstanding link which might be formed due to a blot in the printed character. This upstanding link is defined herein as a "whisker"; and its presence also might lead to an inability to identify correctly the sensed image.

In accordance with the present invention, small lagoons or puddles, and whiskers are detected and eliminated from the scanned image by the smoother included in path tracer and feature analyzer 20. In particular, a whisker is defined as a link formed of no more than three pixels. Such a small link normally is not expected in a valid or legitimate character. Thus, the whisker extending upward from the image shown in FIG. 8A is ignored; and all data relating thereto is deleted.

Likewise, a puddle is identified as a lagoon whose extreme dimensions, that is, whose width and height ($x_{max}$ and $y_{max}$) are less than predetermined amounts. A lagoon of this small size is construed as a puddle; and all data relating thereto is ignored, eliminated or deleted.

It will be recalled that the smoother also functions to eliminate beaches from the scanned, thinned image. As mentioned above, small concavities are recognized as beaches if the size of the concavity is less than a predetermined amount, such as less than 1/16 of the overall size of the image "block", and also as a function of its orientation with respect to preceding and following concavities and convexities whose sizes relative to the image block also are examined. Hence, links may be "straightened".

FIG. 8B represents the character "6" after removal of the whisker and puddle therefrom. The image shown in FIG. 8B then is analyzed in the manner described above in conjunction with FIG. 4. It should be noted that, for convenience, points which are identified with triangles, squares and circles are "class 1", "class 2" and "class 3" points, respectively. It will be appreciated that, when the analysis described above in conjunction with FIG. 4 is applied to the image shown in FIG. 8B, this image is properly identified as the numeral "6".

The purpose of and advantages derived from rearranger 28 now will be described in conjunction with FIGS. 9A and 9B. Let it be assumed that the document presented to image pick-up device 10 is an envelope. FIG. 9A represents the line-by-line address as follows:

---

Comm. of Patents
Washington, D.C.
20231

---

In the preferred embodiment, a column of image sensors is long enough to scan these three lines concurrently. Scanning in the top-to-bottom and right-to-left directions, each of the scanned characters will be identified, in accordance with the procedure discussed above, such that first the final "s" in patents is identified, followed by the period ("."), followed by the numeral "1" in the zip code, followed by the "t" in patents, followed by the "C", followed by the numeral "3" and so on. The resultant recognized characters appear as shown in FIG. 9B. Periods and comas are recognized as small data blocks located in the vicinity of the bottom edges of the other alphanumeric characters.

Although the recognized characters shown in FIG. 9B are read out in a right-to-left manner, characters of one line are interspersed with characters of other lines. One feature of the present invention rearranges the read out, or recognized characters in their proper lines.

It is recalled that, in addition to tracing the path of each image and analyzing its geographical features, the XY coordinate of the center of gravity of the image (or data) block also is obtained. Thus, and with reference to the characters shown in FIG. 9B, the center of gravity of the letter "s" will correspond to a higher line than the center of gravity of period (".") which, in turn, is higher than the center of gravity of the character "1". Likewise, the center of gravity of the character "t" will correspond to a higher line than the center of gravity of the character "C" which, in turn, is greater than the center of gravity of the character "3". By selecting the characters illustrated in FIG. 9B in accordance with their respective centers of gravity, the original characters shown in FIG. 9A may be rearranged in proper line-by-line fashion. Of course, recognizing that the rearranged characters will appear in right-to-left arrangement, the mirror image of that arrangement may be obtained easily by selecting the order of these characters as a function of, for example, the average X coordinate of each.

It may turn out that the characters provided by rearranger 28 contain what has been referred to above as "hard breaks". It is recalled that a "soft break" is formed of two filled pixels which are separated by a distance no greater than the dimensionless numeral 7 when the matrix shown in FIG. 6A is superimposed over those pixels. A hard break is formed when the two filled pixels are separated by a greater distance. It also is recalled that, when a pixel closest to a pixel under examination is outside the "neighborhood" established by the matrix shown in FIG. 6A, that is when the closest pixel is spaced from the pixel under examination by a distance greater than the dimensionless number 7, the end of a "block" containing image data is identified. A hard break thus is present when the dimension of a block of image data, that is, its overall height and width as determined by the XY coordinates of the pixels included in that image block, is less than the overall size of image blocks containing recognized characters. The separation of such a small, out of range block and adjacent blocks, which may or may not be small, out of range blocks themselves, then is detected. Initially, it is assumed that the out of range block under consideration should be joined to the block closest thereto, whether or not that closest block is of "normal" size or itself is a small data block. If, by joining these two blocks, the resultant image block is an oversized out of range block, it is assumed that the joiner is improper. Accordingly, the small out of range block then is attempted to be joined to the next closest block; and the foregoing examination of the overall size of the joined blocks is repeated. This process continues until the out of range block is joined with another block; and the resultant image block is not itself out of range. The data included in this resultant block then is supplied by character reconstructor 29 to path tracer and feature analyzer 20 for the analysis that has been described in detail hereinabove. As a result, the hard break in an image is closed; the critical points and geographical features of that image are determined; and the image is identified as a known character as a function of those geographical features.

Figure 10A:
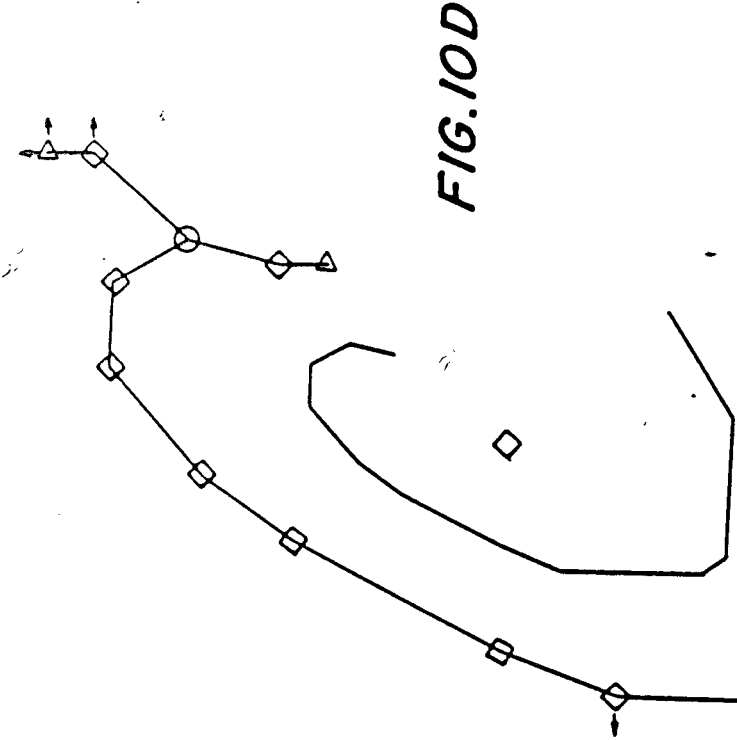
FIGS. 10A-10D are useful in understanding how a "hard" break in a character ("C") is detected and filled to permit proper identification of the hard-broken character.
Figure 10B:
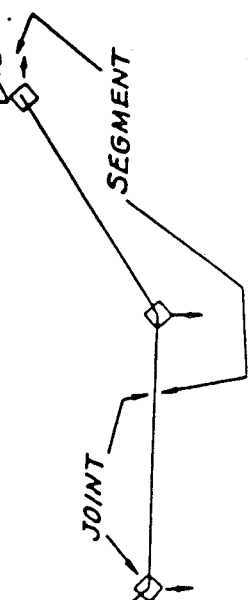
Figure 10C:
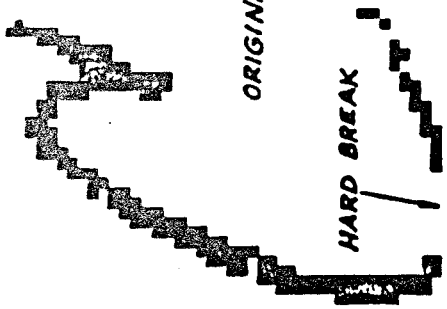

FIGS. 10A-10D represent the manner in which character reconstructor 29 functions to detect and join a hard break in a scanned image. FIG. 10A represents the original image, including the hard break, supplied to image thinning control 12 by image pick-up device 10. FIG. 10B illustrates the thinned image which, of course, contains the hard break. The thinned image is scanned by link identifier 14 and link connector 16, resulting in the formation of two separate image blocks, one image block being constituted by the broken segment shown in the lower right portion of FIG. 10B (which is isolated in FIG. 10C), and the other image block bring formed of the remainder of this image Based upon the XY coordinates of the pixels which constitute the larger image, the link identifier 14 assumes that this larger image is included in a block of "normal" size. However, the smaller, broken segment is recognized as being included in a small image block whose size is out of range.

Each image block is analyzed separately by path tracer and feature analyzer 20, and it is assumed that the geographical features which are detected in each block do not compare favorably with the geographical features stored in dictionary 24. Comparator 22 thus does not recognize either the "normal" size image or the out of range image.

Figure 10D:
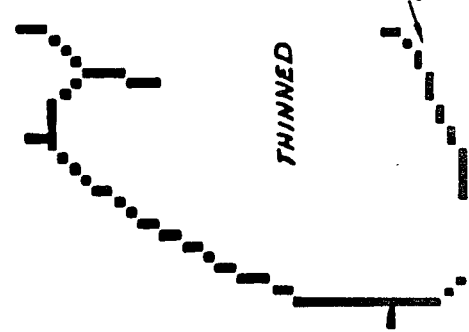

Following the operation of character separator 26 and rearranger 28, character reconstructor 29 is supplied with the data blocks representing the "normal" size image and the out of range image. Although the remaining characters which presumably precede and follow the broken image shown in FIG. 10B are not illustrated, it will be appreciated that character separator 26 and rearranger 28 operate to place these characters in proper horizontal and vertical position. Based on the positions of those recognized characters, it will be appreciated that the broken segment included in the out of range data block is closer to the "normal" size data block shown in FIG. 10B than it is to the other, recognized characters. Consequently, character reconstructor 29 joins the out of range data block to the "normal" size data by inserting a joint therebetween. This joint is illustrated in FIG. 10D.

Thereafter, the joined segment and remaining portion of the scanned image is supplied by the character reconstructor to path tracer and feature analyzer 20, wherein the resultant image is analyzed in the manner discussed above.

Hence, although the hard broken image might not be identified; the broken segment is joined to the remainder of the image; and the joined image then is readily recognized as the character "C".

It should now be appreciated that the use of geographical feature detection to recognize alphanumeric characters, the principle upon which the present invention proceeds, permits character recognition with substantial font insensitivity. This is because the same letter exhibits the same basic geographical features irrespective of its font. Although the overall geographical features which comprise that letter will vary as a function of the serifs and other embellishments that may be used in the printing of that character, it will, nevertheless, contain the same basic geographical features which characterize that letter. If these basic geographical features are not detected, the character will not be recognized; and this is primarily attributed to the fact that the scanned image is, in actuality, not a recognizable character.

Figure 11D:

Examples of the letter "A" which may be printed in different fonts and which may be printed with various serifs and embellishments are illustrated in FIGS. 11A-11D. FIG. 11A represents different fonts which, when analyzed by link identifier 14, path tracer and feature analyzer 20 and comparator 22, will be found to have the following basic geographical feature which characterizes this letter: a lagoon above a bay south. Each of the examples illustrated in FIG 11A is formed of only this arrangement of geographical features, notwithstanding the different fonts or stylized versions illustrated therein.

When, for example, two serifs are added to the legs of the letter "A", such as shown in FIG. 11B, additional geographical features are added to the image. Also, two additional "class 3" and two additional "class 1" points are added. A geofeature analysis of the image shown in FIG. 11B results in the geographical features of a bay northeast next to the combination of a lagoon above a bay south which, in turn, is next to a bay northwest. While the bay northeast and bay northwest are due to the added serifs, it is seen that the basic geographical features of a lagoon above a bay south nevertheless are retained. Of course, the presence of these basic geographical features will permit the recognition of the image shown in FIG. 11B as the letter "A", even with the embellishment provided by the added serifs.

FIG. 11C illustrates examples of still further embellishments and serifs; and FIG. 11D illustrates yet another example of an extremely stylized version of the letter "A". An analysis of the geographical features of this highly stylized version results in the detection of a bay east next to the combination of a lagoon above a bay south which, in turn, is next to the combination of a bay northwest above a bay west. Notwithstanding the additional geographical features attributed to the serifs and embellishments shown in FIG. 11D, the basic geographical feature of a lagoon above a bay south which is inherent in the letter "A" is observed. The images shown in FIGS. 11A-11D will not be properly identified if these basic geographical features are not present.

Thus, in spite of serifs and embellishments to a basic alphanumeric character, the present invention is font insensitive because all such versions of a basic character can be detected in view of the fact that each such version nevertheless includes a basic arrangement of geographical features that characterize the character.

Figure 12:
FIG. 12 is useful in understanding how the subject OCR system effectively separates characters that may be interleaved, thus effecting good segmentation not attainable by known OCR systems.

The advantages achieved by the ability of the present invention to "segment" characters by detecting the beginning and end of each image block as a function of the proximity of adjacent pixels to the last pixel detected in an image is represented in FIG. 12. It is recalled that the end of an image block, that is, the XY coordinate of the last pixel included in that image, is determined by sensing whether a filled pixel is present in the "neighborhood" defined by the matrix shown in FIG. 6A when a pixel under examination is placed at the origin of this matrix. If no filled pixel is found within this "neighborhood", it is assumed that the end of an image block has been reached. Hence, proper segmentation of scanned images is achieved even though a pixel of one image block is disposed in the very same column as the pixel in another image block. In FIG. 12, it is seen that the letter "L" and the numeral "9" overlap; that is, pixels included within the numeral "9" are disposed in the same column as a pixel included in the letter "L". Likewise, it is seen that the numerals "9" and "2" overlap. Nevertheless, the confines of an image block are established as a function of sensing whether a pixel is within the "neighborhood" of another pixel included in the same image.

Likewise, overlap of the letters "A" and "W" do not prevent the proper segmentation of these two letters. Similarly, the fact that a portion of the numeral "9" exhibits horizontal overlap with a portion of the letter "W", does not prevent proper segmentation of these characters. Furthermore, in view of the aforedescribed operation of rearranger 28, it is determined that the numeral "9" should be disposed on the upper line of characters shown in FIG. 12, and not the lower line. That is, the center of gravity of the image block containing the numeral "9" is determined to be closer to the center of gravity of the characters included in the upper line of FIG. 12 than to the center of gravity of the characters included in the lower line.

It is preferred that the aforedescribed OCR technique be implemented by a combination of hardware and software. An appropriate mini-computer, such as the VAX or micro-VAX, manufactured by Digital Equipment Corp., may be programmed to carry out the function of the blocks illustrated in FIG. 1 and described in detail above. An example of such software is set out in the flow charts of FIGS. 13A-13C; and one of ordinary skill in the programming art as well as in the optical character recognition art would be readily enabled thereby to program a suitable micro- or-mini-computer to carry out the functions described herein.

The following description now refers to the "matrix arithmetic" by which the relative positions of different features, that is, the juxtapositions of features with respect to each other, are represented. Such representations facilitate processing by a minicomputer; and the matrix arithmetic (to be described) is readily implemented by suitable programming known to those of ordinary skill in the art.

For convenience, the juxtapositions of geographical features which are present at a "class 3" point will be described; but it will be readily appreciated that the matrix representation may be easily applicable to describe the geographical features present at a "class 4" point. It is recalled that a "class 3" point is defined by the intersection of three links and that a "class 4" point is defined by the intersection of four links. The manner in which respective "class 3" and "class 4" points are recognized and located by their XY coordinates has been described above. Furthermore, it is assumed herein that the various geographical features have been recognized by the aforementioned path tracer and geographical feature analyzer 20. The present description proceeds from the assumption that a "class 3" point and the various geographical features present at that "class 3" point have been identified.

Turning now to FIGS. 14A-14M, various orientations of geographical features F1, F2 and F3 present at a class 3 point are illustrated. Although not illustrated in the accompanying drawings, description is provided below with respect to the orientations of geographical features present at a class 4 point. For convenience, the geographical features are identified simply as features F1, F2 and F3 these features being formed as bays or lagoons, as mentioned above. The digital representations of these respective features have been discussed previously with respect to FIG. 7.

Each of FIGS. 14A-14M illustrates not only the juxtapositions of geographical features F1, F2 and F3, but also the triad points A, B and C which, in combination with class 3 point O form three respective links which, in turn, define the juxtapositions of features F1, F2 and F3. These triad points A, B and C are positioned in different ones of quadrants Q1, Q2, Q3 and Q4 and, moreover, and as will be apparent from referring to these drawing figures, the particular locations of the triad points in the respective quadrants establish different angles between each link and the abscissa and ordinate relative to class 3 point O. In FIG. 14A, triad point A is disposed in quadrant Q1, forming a very small angle with respect to the abscissa, triad point B is disposed in quadrant Q3 and triad point C is disposed in quadrant Q2. Commencing with the triad point disposed in quadrant Q1 and proceeding in a clockwise direction about class 3 point O, a "quadrant pattern" 132 is established, representing that, in this clockwise order of triad points, the first triad point is disposed in quadrant Q1, the second triad point is disposed in quadrant Q3 and the third triad point is disposed in quadrant Q2. Furthermore, the relative orientations of features F1, F2 and F3 may be described as feature F3 being disposed next to feature F2, and this combination being disposed above feature F1, all mathematically being represented as: (F3+F2)/F1. This very same orientation of geographical features alternatively may be described as feature F3 disposed above feature F1 and this combination being disposed next to feature F2, which may be mathematically represented as (F3/F1)+F2. It is appreciated that the operator "+" represents the "next to" orientation and the operator "/" represents the "above" orientation.

It is a feature of the present invention to represent the foregoing mathematical expressions which, in turn, describe (or characterize) the juxtapositions of the respective geographical features, in matrix format. The matrix representation is formed of rows and columns of elements, each element being constituted by a respective feature. A row of elements represents those features which are "next to" each other and a column of elements represents those features which are "above" each other. The matrix representation of features which form a class 3 point consists of a 2×2 matrix. To proceed from the mathematical expression (F3+F2)/F1 to the matrix representation thereof, the mathematical expression is expanded to its equivalent form of (F3/F1)+(F2/F1). The resultant matrix representation is shown in FIG. 14A. Likewise, the mathematical expression (F3/F1) +F2 is expanded to the equivalent expression (F3/F1) +(F2/F2). The matrix representation of this expanded mathematical expression also is shown in FIG. 14A.

Although either of the matrix representations shown in FIG. 14A may be selected to describe the juxtapositions of features F1, F2 and F3, the actual selection is dependent, to a significant degree, upon the angle formed by each link relative to the abscissa and ordinate passing through class 3 point O. That is, depending upon the particular position of each triad point in its respective quadrant, one or the other of these matrix representations will be selected. For example, if link OB forms a relatively small angle with respect to the ordinate and link OC likewise forms a relatively small angle with respect to the ordinate, yet the quadrant pattern of triad points A, B and C remains 132, as shown in FIG. 14B, then the orientations of features F1, F2 and F3 may be represented by the mathematical expression (F3/F1)+F2 which, in turn, is described by the matrix representation shown in FIG. 14B. (Because of optical perception of the human eye, and particularly the capabilities of the simple cells in the striate cortex, a "small" angle is less than approximately 10°) As one example of an alphanumeric character formed of geographical features having this juxtaposition, FIG. 14B illustrates the letter "P" wherein F1 is formed as a bay southeast, F2 is formed as a bay southwest and F3 is formed as a lagoon. The matrix representation of FIG. 14B thus takes the form:

$$\begin{vmatrix} 0 & 6 \\ 4 & 6 \end{vmatrix}$$

FIG. 14C represents the juxtaposition of geographical features similar to those shown in FIG. 14A, except that link OC here is positioned closer to the ordinate. The quadrant pattern exhibited by this orientation of features remains as pattern 132; and the juxtaposition of these features may be mathematically expressed as (F3/F1)+F2, the same as the mathematical expression representing the feature juxtapositions shown in FIG. 14B.

Yet another orientation of geographical features is shown in FIG. 14D. Here, the quadrant pattern is represented as 143, and it is seen that each of the links exhibits a relatively small angle with respect to the abscissa and ordinate. The orientation of features F1, F2 and F3 may be mathematically expressed as (F3+F2)/F1, the same as the first-described mathematical expression for the orientations shown in FIG. 14A. An example of an alphanumeric character which includes this particular orientation of geographical features is the letter "a", wherein F1 is a bay south, F2 is a lagoon and F3 is a bay northeast. The matrix representation of the mathematical expression corresponding to the juxtapositions of these features may be expressed as:

$$\begin{vmatrix} 2 & 0 \\ 5 & 5 \end{vmatrix}$$

Yet another arrangement of features juxtaposed at a class 3 point is illustrated in FIG. 14E. Here, the quadrant pattern is seen to be 143, similar to the quadrant pattern shown in FIG. 14D. However, the angle formed between link OB and the abscissa and the angle formed between link OC and the abscissa are seen to be significantly larger in the configuration shown in FIG. 14E. As a result, the orientation of features may be mathematically expressed either as (F1/F2)+F3 or (F1+F3)/F2. That is, the mathematical expression may be the same as that presented for the orientations shown in FIG. 14B or the same as that for the orientations shown in FIG. 14D. The matrix representations corresponding to these mathematical expressions also are illustrated in FIG. 14E.

Yet another variation of the orientation of features shown in FIG. 14D is illustrated in FIG. 14F. Here, although the quadrant pattern remains as 143, it is seen that link OB exhibits a significant angle with respect to the abscissa, whereas analogous link OA in FIG. 14D exhibits a relatively small angle. The orientation of features shown in FIG. 14F may be included in, for example, the letter "R" wherein feature F1 is seen to be a bay east, feature F2 is seen to be a bay south and feature F3 is seen to be a lagoon. The mathematical expression of the features at this class 3 point is F1+(F3/F2). When the digital identifications of the respective features are substituted, the matrix representation of this mathematical expression is as follows:

$$\begin{vmatrix} 3 & 0 \\ 3 & 5 \end{vmatrix}$$

FIG. 14G represents yet another orientation of features at a class 3 point. Here, links OA and OB exhibit relatively small angles with respect to the ordinate and link OC exhibits a relatively small angle with respect to the abscissa. The quadrant pattern formed by triad points A, B and C is seen to be 432; and the mathematical expression which describes the juxtaposition of the features shown in FIG. 14G is equal to F1+(F3/F2), this mathematical expression being the same as that described above with respect to FIG. 14F. The links shown in FIG. 14G may be included in the alphanumeric character "q" where F1 is equal to a bay northeast, F2 is equal to a bay southwest and F3 is equal to a lagoon. Substituting the digital representations for features F1, F2 and F3, the matrix representation of the juxtaposition of these features is seen to be:

$$\begin{vmatrix} 2 & 0 \\ 2 & 6 \end{vmatrix}$$

Still another orientation of features at a class 3 point is illustrated in FIG. 14H. This orientation is seen to be similar to that shown in FIG. 14E, except that the angle formed between link OA and the ordinate is relatively large. The mathematical expression which describes the orientation of features F1, F2 and F3 is seen to be (F1/F2)+F3 or (F1+F3)/F2 or F1+(F3/F2). That is, the mathematical expression which describes the juxtaposition of these features may be the same as the mathematical expression discussed above in conjunction with FIG. 14E or the mathematical expression discussed above in conjunction with FIG. 14F.

FIG. 14I illustrates yet another orientation of features forming a class 3 point with the triad points associated with these features forming the quadrant pattern 142. As shown in FIG. 14I, the mathematical expression which describes the orientation of these features is the same as the mathematical expression discussed above in conjunction with FIG. 14F.

FIG. 14J is a variation of FIG. 14I, with link OC forming a relatively large angle with respect to the abscissa. The quadrant pattern formed by triad points A, B and C is seen to be 142; and the mathematical expression which describes the juxtaposition of features F1, F2 and F3 is the same as that discussed above in conjunction with FIG. 14F or that discussed above in conjunction with FIG. 14B.

FIG. 14K illustrates yet another orientation of features forming a class 3 point. If it is assumed that links OB and OC are coincident with the ordinate and abscissa, respectively, then the quadrant pattern formed by triad points A, B and C may be 132 or 142 or 143 or 133. Nevertheless, the mathematical expression which describes features F1, F2 and F3 is seen to be the same as that discussed above in conjunction with FIG. 14F.

FIGS. 14L and 14M represent still further juxtapositions of features F1, F2 and F3 forming a class 3 point. It is appreciated that the links which form these features may be included in the letter "Y"; and, depending upon whether link OB lies within quadrant Q4 or quadrant Q3', the quadrant pattern formed by triad points A, B and C is equal to 142 or 132. In FIG. 14M, the quadrant pattern clearly is 132. Nevertheless, the mathematical expression which describes the orientation of features F1, F2 and F3 in both FIGS. 14L and 14M are seen to be the same as the mathematical expressions which have been discussed above in conjunction with FIG. 14J with the additional mathematical expression F3/(F1+F2). In FIG. 14L, for example, feature F1 is equal to a bay southeast, feature F2 is equal to a bay southwest and feature F3 is equal to a bay north. Using the digital representations of these features, the juxtaposition of the features illustrated in FIG. 14L and having the mathematical expression F3/(F1+F2) may be represented by the following matrix representation:

$$\begin{vmatrix} 1 & 1 \\ 4 & 6 \end{vmatrix}$$

A comparison of the different juxtapositions of features forming a class 3 point results in the recognition that, although several different configurations may be formed, there are only four basic mathematical expressions, each of these mathematical expressions, of course, corresponding to a respective matrix representation. Notwithstanding the particular quadrant pattern exhibited by the triad points included in the juxtaposed features, only the four basic expressions are needed. These four different orientations of features at a class 3 point are shown in FIGS. 14B, 14D, 14G and 14L (assuming that links OA and OC in FIG. 14L exhibit relatively small angles with respect to the abscissa), as follows:

| | |
|---|---|
| (F3/F1)+F2 | I |
| (F3+F2)/F1 | II |
| F1+(F3/F2) | III |
| F3/(F1+F2) | IV |

Any one of these four mathematical expressions and its corresponding matrix representation may be used to describe the orientation of features present at a class 3 point.

The foregoing has described the features which are present at a class 3 point. It is appreciated that a class 4 point is defined by four intersecting links, resulting in four separate features at the class 4 point. For example, if a fourth link is provided between links OA and OB in FIG. 4D, feature F1 is divided into two separate features, which may be designated features F1 and F4. Without repeating the analysis set forth hereinabove with respect to FIGS. 14A-14M, it should be recognized that, depending upon the different orientations of features F1, F2, F3 and F4, different corresponding mathematical expressions may be used to describe those feature orientations. Of course, it is recognized that each mathematical expression may, in turn, be described by a corresponding matrix representation. Such an analysis results in seven basic mathematical expressions (or matrix representations) of different feature orientations at a class 4 point, as follows:

$(F1+F2)/(F3+F4)$  V $(F1/F2)+(F3/F4)$  VI $F1+(F2/F3)+F4$  VII $(F1+F2+F3)/F4$  VIII $F1/(F2+F3+F4)$  IX $(F1/F2/F3)+F4$  X $F1+(F2/F3/F4)$  XI

The foregoing mathematical expressions V-XI serve to define the orientations of features provided at a class 4 point notwithstanding the particular quadrant pattern exhibited by those features.

It is, of course, readily appreciated that the matrix representations of mathematical expressions I-XI may be produced, emulated, simulated and processed by a suitably programmed minicomputer, well within the skill and ability of one having ordinary skill in the programming art.

From the foregoing description, it is seen that, depending upon the quadrant pattern of triad points included in the geographical features present at a class 3 point, a set of matrices describes the orientation of those features. The set of matrices may be formed of a single matrix, such as shown above with respect to FIGS. 14B, 14C, 14D, 14F, 14G, 14I and 14K, or the set of matrices may be constituted by two or more matrices, such as shown in conjunctions with FIGS. 14A, 14E, 14H, 14J, 14L and 14M. A particular quadrant pattern, such as pattern 132, may be associated with a set of matrices, and the particular matrix selected from that set which best describes the orientation of geographical features is a function not only of the positions of the links which form those features but also the angles present between each link and the abscissa and ordinate. From the geographical features discussed above with respect to FIG. 14, it is appreciated that quadrant 132, for example, is associated with the following matrix representations:

$$\begin{vmatrix} F1 & F2 \\ F1 & F1 \end{vmatrix}$$

$$\begin{vmatrix} F3 & F2 \\ F1 & F2 \end{vmatrix}$$

$$\begin{vmatrix} F1 & F3 \\ F1 & F2 \end{vmatrix}$$

$$\begin{vmatrix} F3 & F3 \\ F1 & F2 \end{vmatrix}$$

which, of course, is formed of the four basic matrix representations which describe a class 3 point. Alternatively, if the quadrant pattern formed by the triad points is equal to pattern 142, then the set of matrices which may represent the geographical features formed at the class 3 point are as follows:

$$\begin{vmatrix} F1 & F3 \\ F1 & F2 \end{vmatrix}$$

$$\begin{vmatrix} F3 & F2 \\ F1 & F2 \end{vmatrix}$$

$$\begin{vmatrix} F3 & F3 \\ F1 & F2 \end{vmatrix}$$

It will be appreciated, therefore, that different quadrant patterns are associated with different sets of matrices, and for class 3 points each respective set is constituted by one, two, three or four matrices, depending upon the particular orientation of the geographical features. The specific matrix which is selected from the set and which best represents the juxtaposed geographical features is determined by the particular orientations of those features as well as the angles made by each link relative to the abscissa and ordinate.

The foregoing description, for purposes of simplification, has described the matrix sets and selection of a matrix within a set when a class 3 point is analyzed. Likewise, depending upon the quadrant pattern, the geographical features which form a class 4 point may be represented by a matrix selected from a set, the particular set being determined by the quadrant pattern, and the particular matrix selected from that set being determined by the orientation of the respective geographical features present at the class 4 point as well as the angles made by the links relative to the abscissa and ordinate. That is, it is the positions of the links which determine the particular matrix that is selected from the set associated with the quadrant pattern.

In the examples discussed above, it has been assumed that, with respect to a class 3 point, the triad points are disposed in three different quadrants. It has been found that, for alphabetic characters normally used in the English language and for numerals, all three triad points will not be present in the same quadrant. It is, however, possible for two of the three triad points to be present in a single quadrant. Likewise, for a class 4 point, three of the four links which form that point will not be disposed in the same quadrant.

Turning now to FIGS. 15A-15D, the following description points out how a particular matrix included in a set of matrices is selected as a function of the angles formed by the links and the abscissa and ordinate. Let it be assumed, for example, that a class 3 point under consideration constitutes the intersection in the letter "Y", as shown in FIG. 15A. The juxtaposition of features F1, F2 and F3 is similar to that discussed above with respect to FIG. 14M, and the quadrant pattern established by triad points A, B and C is 132. If the angle between link OA and the ordinate is assumed to be not small, the mathematical expression which describes the illustrated features may be either $F3/(F1+F2)$ or $F1+(F3/F2)$. The matrix representations of these mathematical expressions are shown in FIG. 15A. By comparison with FIG. 14M, it is seen that the mathematical expression $(F3/F1)+F2$ is not appropriate. As will now be described, the particular angle formed between each link and the abscissa or ordinate determines, at least in part, the particular matrix representation that best describes the juxtaposed features.

In FIG. 15B, it is assumed that links OA and OB remain as they appear in FIG. 15A, and link OC now forms a relatively small angle with respect to the ordinate. While the quadrant pattern remains at 132, the mathematical expression which best represents the juxtaposed features is seen to be (F3/F1)+F2; and the matrix representation is as shown in FIG. 15B.

In FIG. 15C, links OB and OC remain as they appear in FIG. 15A, and link OA now exhibits a relatively small angle with respect to the abscissa. Once again, the quadrant pattern is 132; and the mathematical expression which best represents the juxtaposed features is seen to be (F3/F1)+F2. The corresponding matrix representation is as shown in FIG. 15C. The juxtaposed features illustrated in FIGS. 15B and 15C are described by the very same matrix representation.

In FIG. 15D, links OA and OB remain as they appear in FIG. 15C; and link OC now exhibits a relatively small angle with respect to the abscissa. The quadrant pattern remains at 132; but the mathematical expression which best describes the juxtaposed features now is seen to be F3/(F1+F2). FIG. 15D additionally illustrates the matrix representation of these juxtaposed features.

From the foregoing, it is seen that if the quadrant pattern is 132, the set of matrices which may be used to describe the juxtaposed features is as shown in FIG. 15A, and the particular matrix representation which is selected from that matrix is determined by the angle formed by one or more of the links with respect to the abscissa and the ordinate. Since triad points A, B and C are defined by the XY coordinates thereof, as discussed above, such angles are easily determined and, thus, the appropriate matrix representation is selected. It is appreciated that sets of matrices associated with respective quadrant patterns may be stored in, for example, a look-up table or the like.

The manner in which a matrix representation of a scanned alphanumeric character is determined now will be described with reference to FIGS. 16A-16D. Turning first to FIG. 16A, it is assumed that the illustrated character (which the reader will recognize as the letter "B") is scanned. As has been discussed above, class 3 points O, C, D and E are identified, and the XY coordinates of the pixels at which these class 3 points are located are stored. The features which are formed by the scanned character are seen to be features F1, F2, F3 and F4 and, as has been discussed previously, feature F1 is recognized as a bay east, feature F2 is recognized as a lagoon, feature F3 is recognized as a lagoon and feature F4 is recognized as a bay west. When analyzing the class 3 points, it is appreciated that features F1, F2 and F3 are juxtaposed at class 3 point O, features F2, F3 and F4 are juxtaposed at class 3 point C, features F2 and F3 are juxtaposed at class 3 point D and features F3 and F4 are juxtaposed at class 3 point E. From this analysis, it will be recognized that points O and C should be analyzed because these class 3 points are each formed by the juxtaposition of three features. That is, no further feature information is provided by additionally analyzing points D and E. Since path tracer and feature analyzer 20 (FIG. 1) has identified the features and the intersection points at which they are located, it is known therefrom that full information regarding the features of the scanned character can be obtained merely by analyzing points O and C.

Turning to FIG. 16B, the triad points A, B and C relative to class 3 point O are illustrated. That is, point O is isolated in FIG. 16B. The quadrant pattern formed by triad points A, B and C is 143; and link OC is seen to exhibit a relatively small angle with respect to the abscissa. Thus, the mathematical expression and corresponding matrix representation discussed above with respect to FIG. 14F is selected to describe the juxtaposition of features F1, F2 and F3 at point O. The mathematical expression is equal to F1+(F3/F2), and the corresponding matrix representation is represented here as a submatrix $M_1$ (the reason for the designation "submatrix" will become clear from the ensuing description):

$$\begin{vmatrix} F1 & F3 \\ F1 & F2 \end{vmatrix}$$

Turning now to point C, FIG. 16C illustrates this class 3 point isolated from the remainder of the scanned character. Here, it is seen that link CO exhibits a relatively small angle with respect to the abscissa and each of links CD and CE exhibits a relatively small angle with respect to the ordinate. The quadrant pattern formed by triad points E, O and D may be viewed as 114, 142 (point E may be in quadrant Q2) or 113. The mathematical expression which describes the juxtaposition of features F2, F3 and F4 for each of these quadrant patterns wherein the respective links exhibit small angles with respect to the abscissa and ordinate is (F3/F2)+F4. The corresponding submatrix representation $M_2$ is seen to be:

$$\begin{vmatrix} F3 & F4 \\ F2 & F4 \end{vmatrix}$$

As mentioned above, it is assumed that the alphanumeric character which is presented for identification is scanned in the top-to-bottom and right-to-left directions. Consequently, the matrix representation of the juxtaposed features which constitute the scanned character is formed by adding the respective submatrices which describe the juxtaposed features. More particularly, the submatrix which has been determined for class 3 point O and the submatrix which is determined for class 3 point C are summed. The submatrix representations of juxtaposed features at points D and E are superfluous, as mentioned above, and, thus, need not be included in this summation. However, if additional class 3 or class 4 points were present in the scanned character, and one or more of these additional points were formed by one or more features that had not been taken into account when forming the submatrices for points O and C, the submatrices for such additional points would be summed with submatrices $M_1$ and $M_2$.

In the example presently described, the matrix representation M of the juxtaposed features which constitute the scanned character is formed by summing the submatrices $M_1$ and $M_2$ such that $M=M_1+M_2$. FIG. 16D illustrates this matrix representation summation. It is seen that, if a column of elements included in one submatrix is equal to a column of elements included in the other, the common columns simply are superimposed, and the matrix expression is expanded. That is, the second column of the first submatrix is identical to the first column of the second submatrix, and the resultant matrix representation thus includes this common column together with a third column which is constituted by the second column of the second submatrix.

If, as an example, a scanned character includes three separate class 3 points such that matrix representations of all three points are needed to adequately describe the juxtaposed geographical features at each, then the submatrices formed for each class 3 point must be summed. Also, and although the matrices which have been discussed hereinabove with respect to illustrative class 3 points have been formed of two rows and two columns (that is, each matrix or submatrix representation of the juxtaposed features at a class 3 point consists of a 2×2 matrix), it is expected that the matrix representation describing a class 4 point may be formed as a 3×3 array. Furthermore, since the matrix representation of a scanned character formed of two or more class 3 and/or class 4 points is obtained by summing the submatrices for each of these points, the size of the resultant matrix may be as large as a 4×4 matrix. It has been found that no more than four "vertical" or "horizontal" features are included in conventional alphanumeric characters. Thus, a 4×4 matrix adequately represents the juxtaposed geographical features which constitute virtually any scanned alphanumeric character.

As mentioned above, it is preferred that the OCR technique described herein, and particularly the matrix arithmetic used to represent a scanned character, be implemented by an appropriate minicomputer, such as the VAX or MICRO-VAX manufactured by Digital Equipment Corp., or by a microcomputer of appropriate storage capacity. An example of the software used to carry out the OCR technique is represented by the flow charts illustrated in FIGS. 13A–13C.

Figure 13A:
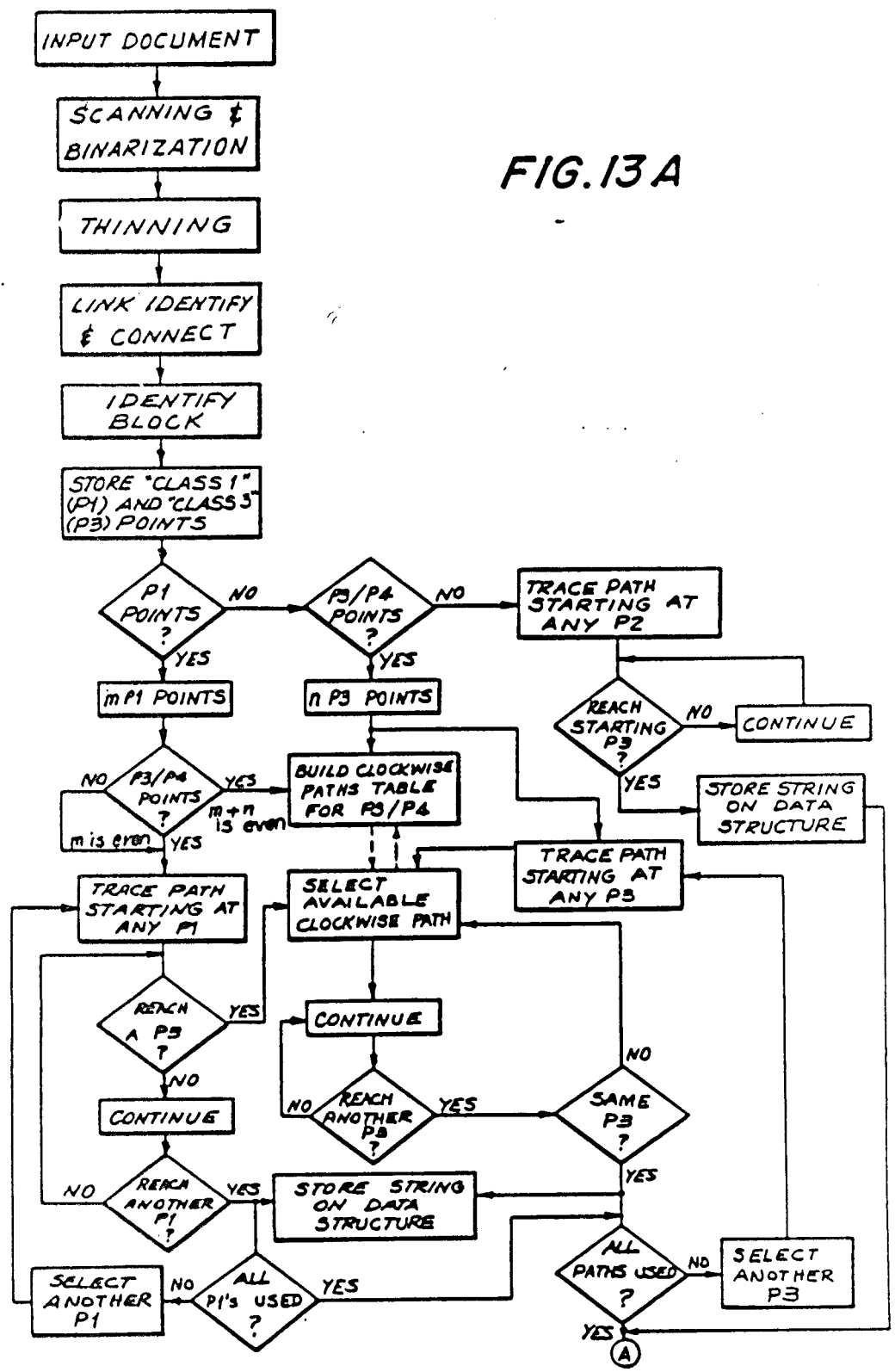
FIGS. 13A-13C are flow charts which represent the manner in which a suitably programmed minicomputer operates to carry out the OCR technique.
Figure 13B:
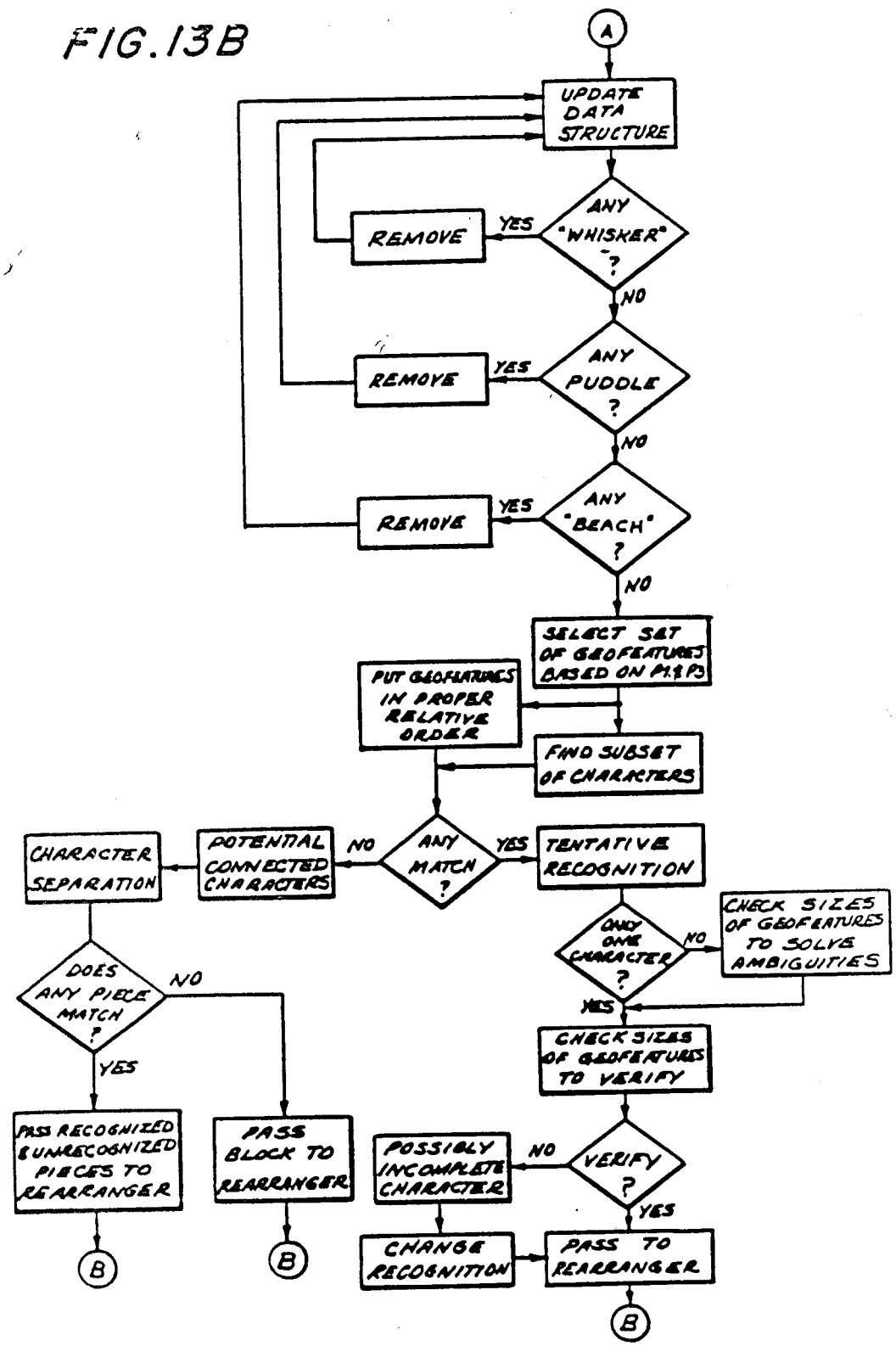
Figure 13C:
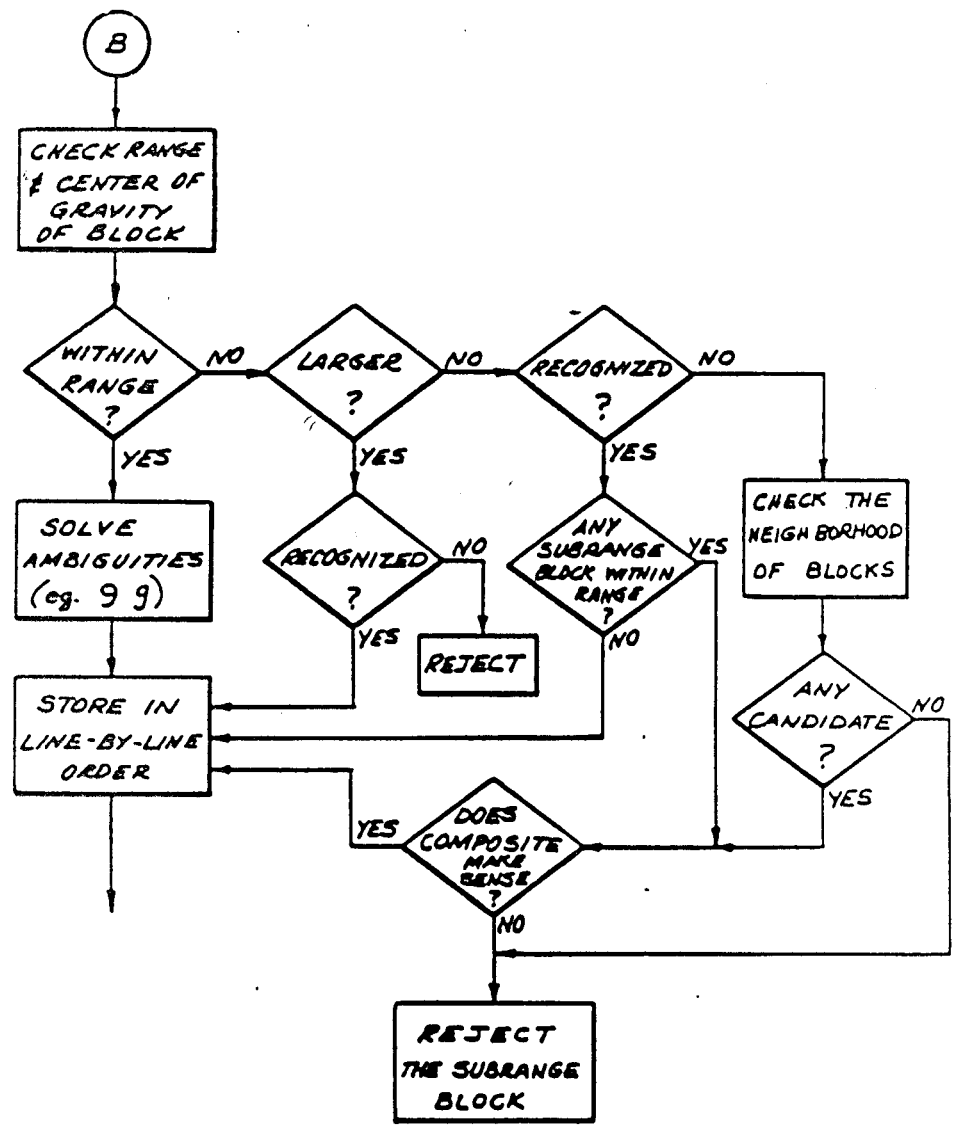
Figure 17:
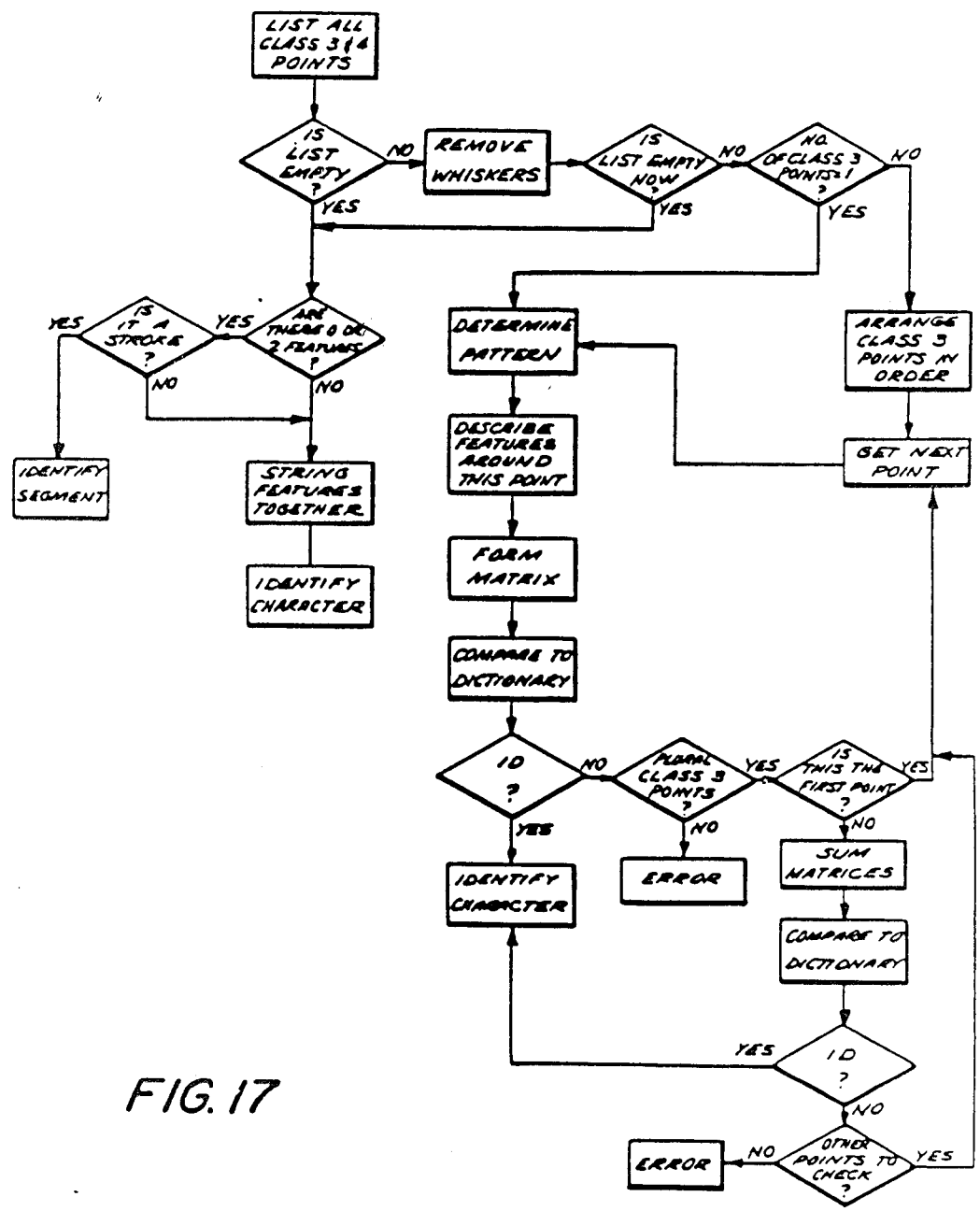
FIG. 17 is a flow chart which represents the manner in which a programmed processor carries out the present invention.

FIG. 17 illustrates a flow chart which is a modification of the flow charts shown in FIGS. 13A–13C to the extent that FIG. 17 includes an implementation of the aforedescribed matrix arithmetic. One of ordinary skill in the programming art would be readily enabled to program a minicomputer or a microcomputer to carry out the flow chart shown in FIG. 17.

While the present invention has been particularly shown and described with reference to a preferred embodiment, it will be readily appreciated by those of ordinary skill in the art that various changes and modifications may be made. By reason of the geographical features which are analyzed and identified, it is appreciated that the present invention is not limited solely to a particular one or selected few fonts. Indeed, the present invention can function, generally successfully, to recognize handprinted characters.

It is intended that the appended claims be interpreted as including the preferred embodiment described herein as well equivalents thereto.

What is claimed is:

1. A method of recognizing alphanumeric characters, comprising the steps of:
   scanning a character;
   detecting the occurrence of predetermined geographical features in the scanned character;
   forming a matrix representation representing the juxtapositions of the detected geographical features;
   comparing the formed matrix with stored predetermined matrices, each stored matrix representation representing a respective alphanumeric character; and
   identifying the scanned character as the alphanumeric character represented by the matrix to which the formed matrix compares.

2. The method of claim 1 wherein the step of detecting the occurrence of predetermined geographical features in the scanned character includes the steps of detecting each intersection point in the scanned character (wherein an intersection point is formed of at least three intersecting links of the scanned character), and determining the respective geographical features present at each intersection point; and wherein the step of forming a matrix representation includes the steps of representing said respective geographical features at each intersection point as submatrices, and summing the submatrices for each intersection point to form said matrix representation.

3. The method of claim 2 wherein a set of predetermined submatrix representations is provided to represent the juxtaposition of geographical features present at an intersection point, and the submatrix representation which represents the geographical features at an intersection point is selected from said set.

4. The method of claim 3 wherein the submatrix representation which is selected from the set is a function of the orientation of the respective features present at said intersection point.

5. The method of claim 4 wherein the orientation of respective features present at an intersection point is determined by the positions of the links which define that intersection point.

6. The method of claim 5 wherein the positions of the links which define an intersection point are classifiable into predetermined arrangements each of which is represented by a respective submatrix representation.

7. The method of claim 6 wherein said predetermined arrangements represent the juxtapositions of features present at an intersection point as being next to each other and as being above each other.

8. The method of claim 7 wherein each feature is represented by an identification code, wherein each submatrix representation is comprised of rows and columns of elements, each element comprising an identification code to represent the juxtapositions of the features present at an intersection point, and wherein submatrix representations are summed by overlapping a row or a column of elements common to the summed submatrix representations.

9. The method of claim 8 wherein a character is scanned in a top-to-bottom and in a right-to-left direction; and wherein the juxtapositions of the features present at an intersection point are determined in the scanning direction.

10. The method of claim 8 wherein respective points on the links which form the intersection point are identified, wherein quadrants (referenced to the intersecting point) in which the respective points are located are identified, wherein the identities of said quadrants are arranged in a predetermined order, and wherein the pattern of quadrant identities establishes a predetermined arrangement.

11. The method of claim 10 further comprising the steps of associating plural predetermined arrangements with at least one pattern of quadrant identities; determining an angle formed by each link with the abscissa and ordinate which define said quadrants; and selecting one of said plural predetermined arrangements as a function of the determined angles.

12. In a method for recognizing alphanumeric characters wherein a character is scanned, each intersection point formed of at least three links is detected, triad points on said at least three links forming an intersection point are identified, and respective geographical features formed by said triad points are indicated, the steps comprising:
determining the juxtaposition of said respective geographical features relative to each other; and
forming a matrix representation representative of the juxtaposed geographical features.

13. The method of claim 12 wherein said geographical features are included in the set comprising bays and lagoons.

14. The method of claim 12 wherein the juxtaposition of features comprises features next to each other when the character is scanned in a horizontal direction, and features above each other when the character is scanned in a vertical direction.

15. The method of claim 14 wherein said intersection point defines an origin, said at least three links extend into at least two quadrants relative to said origin, and said triad points are disposed in said at least two quadrants; and further comprising the steps of detecting the respective angles formed by each link relative to an abscissa and an ordinate which defines the quadrants, and determining the juxtaposition of said respective geographical features as a function of said angles.

16. The method of claim 14 wherein said intersection point defines an origin, said at least three links extend into at least two quadrants relative to said origin, and said triad points are disposed in said at least two quadrants; and further comprising the steps of sensing the order of the quadrants in which said triad points are disposed, and provisionally determining the juxtaposition of said respective geographical features as a function of said order.

17. The method of claim 16 wherein said order comprises a clockwise direction about said origin, and the quadrants in which said triad points are disposed are arranged in clockwise order.

18. The method of claim 16 wherein the particular order of the quadrants in which said triad points are disposed constitutes a quadrant pattern, wherein each quadrant pattern is associated with a set of matrices, each set being comprised of one or more matrices, and wherein a set of matrix representations is selected to represent the juxtaposed geographical features as a function of the sensed order of quadrants.

19. The method of claim 18 further comprising the steps of detecting the respective angles formed by each link relative to an abscissa and an ordinate which define the quadrant, and selecting a matrix representation included in the selected set of matrices as a function of the detected angles.

20. The method of claim 12 further comprising the step of summing the matrix representations formed for each intersection point.

21. The method of claim 20 further comprising the steps of comparing the summed matrix representations to a store of matrix representations, each stored matrix representation representing a known alphanumeric character; and identifying the scanned character as a known alphanumeric character in accordance with the comparison.

22. The method of claim 12 wherein each intersection point and each triad point is sensed by generating a pixel array representative thereof, respective pixels having predetermined coordinates identified by digital signals.

23. An optical character recognition system, comprising:
scanning means for scanning a character to be recognized;
signal generating means for generating signals representing elements which form the scanned character; and
processor means responsive to said signals and programmed to detect the occurrence of predetermined geographical features in the scanned character, said processor means being additionally programmed to generate signals representative of a matrix representation representing the juxtapositions of the detected geographical features, and said processor means being further programmed to identify the scanned character in accordance with the make-up of said matrix representation.

24. The system of claim 23 further comprising storage means for storing representations of predetermined matrix representations, each predetermined matrix representation being associated with a known alphanumeric character; and wherein said processor means is further programmed to compare the generated matrix representation to the stored predetermined matrices and to identify the scanned character as the known alphanumeric character associated with the predetermined matrix representation to which the generated matrix representation compares.

25. The system of claim 24 wherein said signal generating means generates signals representing intersection points included in the scanned character (an intersection point being formed by the intersection of at least three links of said scanned character); and wherein said processor means is programmed to generate a matrix representation representing the juxtaposition of geographical features at each intersection point.

26. The system of claim 25 wherein said processor means is programmed to sum the matrix representations generated for each intersection point.

27. The system of claim 26 wherein said signal generating means generates signals representing triad points linked to each intersection point; wherein said processor means is programmed to determine a respective quadrant relative to an intersection point in which each triad point is disposed: wherein said processor means includes a table of matrix representations; and wherein said processor means is further programmed to select a matrix representation from said table as a function of said quadrants.

28. The system of claim 27 wherein said processor means is programmed to detect respective angles between each link (from a triad point to said intersection point) and the abscissa and ordinate comprising the quadrant in which the link is positioned, and to further select a matrix from said table as a function of the detected angles.

29. The system of claim 27 wherein said triad points are identified by signals representing respective coordinates of said triads; and wherein said processor means is programmed to arrange the quadrants in which said triad points are disposed in a predetermined order, the order of said quadrants being determinative, at least in part, of the matrix representation selected from said table.

30. The system of claim 29 wherein said predetermined order of quadrants is a clockwise order, such that the triad points are arranged in the following succession: first quadrant, fourth quadrant, third quadrant and second quadrant.

31. The system of claim 26 wherein each matrix representation is formed of rows and columns of geographical features, one of said rows and columns representing features that are next to each other and the other of said rows and columns representing features that are above each other.

32. The system of claim 31 wherein said scanning means scans a character in top-to-bottom and in right-to-left directions.

33. The system of claim 31 wherein said processor means sums the generated matrix representations by overlapping a row or a column of features common to the summed matrix representations.

34. The system of claim 23 wherein said geographical features comprise bays and lagoons.

* * * * *